(12) United States Patent
van der Merwe

(10) Patent No.: US 12,432,177 B2
(45) Date of Patent: *Sep. 30, 2025

(54) DATA PLANE FRAMEWORK FOR REDIRECTING DATA PACKETS

(71) Applicant: SOPHOS LIMITED, Abingdon (GB)

(72) Inventor: Dirk Jacobus van der Merwe, Vancouver, WA (US)

(73) Assignee: Sophos Limited (GB)

( * ) Notice: Subject to any disclaimer, the term of this patent is extended or adjusted under 35 U.S.C. 154(b) by 147 days.

This patent is subject to a terminal disclaimer.

(21) Appl. No.: 18/296,000

(22) Filed: Apr. 5, 2023

(65) Prior Publication Data

US 2024/0340266 A1    Oct. 10, 2024

(51) Int. Cl.
*H04L 9/40* (2022.01)

(52) U.S. Cl.
CPC .......... *H04L 63/0236* (2013.01); *H04L 63/20* (2013.01); *H04L 63/30* (2013.01)

(58) Field of Classification Search
CPC ..... H04L 63/0236; H04L 63/20; H04L 63/30; H04L 63/0227; H04L 63/0263; H04L 63/0272

See application file for complete search history.

(56) References Cited

U.S. PATENT DOCUMENTS

| | | | |
|---|---|---|---|
| 8,200,924 B2 | 6/2012 | Sandorfi et al. | |
| 9,210,187 B1 | 12/2015 | Mackey et al. | |
| 9,864,874 B1 | 1/2018 | Shanbhag et al. | |
| 10,999,168 B1* | 5/2021 | Gupta | H04L 43/045 |
| 11,184,191 B1 | 11/2021 | Indiradevi et al. | |
| 11,540,009 B2* | 12/2022 | Sidhu | H04N 21/434 |
| 11,584,191 B2 | 2/2023 | Potticary et al. | |

(Continued)

FOREIGN PATENT DOCUMENTS

| | | | | |
|---|---|---|---|---|
| CN | 113037522 A | * | 6/2021 | |
| CN | 114401245 A | * | 4/2022 | G06F 9/545 |

(Continued)

OTHER PUBLICATIONS

"Express Data Path," Wikipedia, Mar. 25, 2023. https://en.wikipedia.org/wiki/Express_Data_Path.

(Continued)

*Primary Examiner* — John B King
(74) *Attorney, Agent, or Firm* — Schmeiser, Olsen & Watts LLP; Victor J. Baranowski, Esq.

(57) ABSTRACT

A method for redirecting data packets includes receiving, by a first virtual ethernet device pair of a computer system having one or more computer processors, at least one data packet, intercepting, by a packet filter deployed by the first virtual ethernet device pair, the at least one data packet, redirecting, by the first virtual ethernet device pair based on the intercepting, the at least one data packet to a second virtual ethernet device pair, executing, by the second virtual ethernet device pair, an express data path data security program on the at least one data packet, and after the express data path security program has been executed on the at least one data packet, redirecting the at least one data packet back to the first virtual ethernet pair. Further disclosed is a computer system and computer program product configured to perform the method.

20 Claims, 19 Drawing Sheets

(56) References Cited

U.S. PATENT DOCUMENTS

| | | |
|---|---|---|
| 2002/0188871 A1 | 12/2002 | Noehring et al. |
| 2009/0059837 A1* | 3/2009 | Kurk .................. H04L 41/0806 |
| | | 370/315 |
| 2009/0296685 A1 | 12/2009 | O'Shea et al. |
| 2011/0138058 A1* | 6/2011 | Ishida .................... H04L 69/16 |
| | | 709/227 |
| 2016/0036688 A1 | 2/2016 | Wang et al. |
| 2016/0226826 A1 | 8/2016 | Pan et al. |
| 2019/0109713 A1 | 4/2019 | Clark et al. |
| 2020/0358788 A1 | 11/2020 | Lee et al. |
| 2021/0211408 A1* | 7/2021 | Porras ................... G06N 3/045 |
| 2022/0150581 A1* | 5/2022 | Sidhu ................. H04N 21/4223 |
| 2022/0385631 A1* | 12/2022 | McDowall .......... H04L 63/0236 |
| 2023/0066013 A1* | 3/2023 | Ball ...................... G06F 21/606 |
| 2023/0198964 A1* | 6/2023 | Viswambharan ... H04L 63/0485 |
| | | 713/168 |
| 2023/0319011 A1* | 10/2023 | Wang .................. H04L 63/0263 |
| | | 726/11 |

FOREIGN PATENT DOCUMENTS

| | | | | |
|---|---|---|---|---|
| CN | 115801482 A | * | 3/2023 | |
| CN | 116016295 A | * | 4/2023 | |
| CN | 116248373 A | * | 6/2023 | |
| JP | 7291445 B1 | * | 6/2023 | ........... G06F 18/232 |

OTHER PUBLICATIONS

Notice of Allowance in U.S. Appl. No. 18/296,008 mailed on Apr. 4, 2025.

\* cited by examiner

| Offset | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | METADATA MAGIC ||||||||||||||||  METADATA TOTAL LENGTH (32b words) |||||||| METADATA BASE VERSION || METADATA BASE LENGTH (32b words) ||||||||
| 4 | FLOW HASH |||||||||||||||||||||||||||||||| 
| 8 | EGRESS INDEX |||||||||||||||| INGRESS INDEX ||||||||||||||||
| 12 | TTL |||| FLAGS |||||||||||| L3 OFFSET |||||||| unused ||||||||
| 16 | ACTION LIST ||||||||||||||||||||||||||||||||
| 20 | ACTION LIST (optional) ||||||||||||||||||||||||||||||||
| 24 | METADATA EXT TYPE |||| METADATA EXT VERSION |||| METADATA EXT LENTH (32b words) |||||||| METADATA EXTENSION #1 (payload) ||||||||||||||||
| 28 | METADATA EXTENSION #1 (payload) ||||||||||||||||||||||||||||||||
| 32 | METADATA EXT TYPE |||| METADATA EXT VERSION |||| METADATA EXT LENTH (32b words) |||||||| METADATA EXTENSION #2 (payload) ||||||||||||||||
| 36 | METADATA EXT TYPE |||| METADATA EXT VERSION |||| METADATA EXT LENTH (32b words) |||||||| METADATA EXTENSION #3 (payload) ||||||||||||||||
| 40 | <PACKET DATA> ||||||||||||||||||||||||||||||||

Braces on right: rows at offset 0 → 810; rows 4–20 → 820; rows 24–28 → 830; rows 32–36 → 840a; row 40 → 840b.

DATA PLANE FRAMEWORK FOR REDIRECTING DATA PACKETS

FIELD

The present disclosure relates to generally to cybersecurity using a data plane framework for redirecting data packets. More specifically, this application relates to redirecting data traffic to one or more network services using virtual ethernet (veth) pairs.

BACKGROUND

Effective cybersecurity network products require intelligent traffic control based on configurable security policies and high-performance packet inspection engines. Current solutions which provide cybersecurity network services involve relinquishing some control over the granularity of policies and services which can be provided or customizing an operating system to share appropriate information with data inspection engines. Customizing the operating system is not possible in a Public Cloud deployment scenario, which can lead to less effective cloud-based cybersecurity network products. It would be advantageous in the art to provide the ability to use an unmodified operating system kernel to redirect traffic to a variety of customized network services, both in userspace and in-kernel, while maintaining good performance.

SUMMARY

According to embodiments disclosed herein, a method, and associated computer system and computer program product for redirecting data packets is provided. According to the method, a first virtual ethernet device pair of a computer system having one or more processors receives at least one data packet. A packet filter deployed by the first virtual ethernet device pair intercepts the at least one data packet. Based on the intercepting, the first virtual ethernet device pair redirects the at least one data packet to a second virtual ethernet device pair. The second virtual ethernet device pair executes an express data path (XDP) data security program on the at least one data packet. After the express data path security program has been executed on the at least one data packet, the at least one data packet is then redirected back to the first virtual ethernet pair.

BRIEF DESCRIPTION OF THE DRAWINGS

The above and further advantages disclosed herein may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the described embodiments.

FIG. 8 depicts a metadata structure with extensions, in accordance with an example embodiment.

FIG. 9 depicts an action processing sequence, in accordance with an example embodiment.

DETAILED DESCRIPTION

Figure 1:
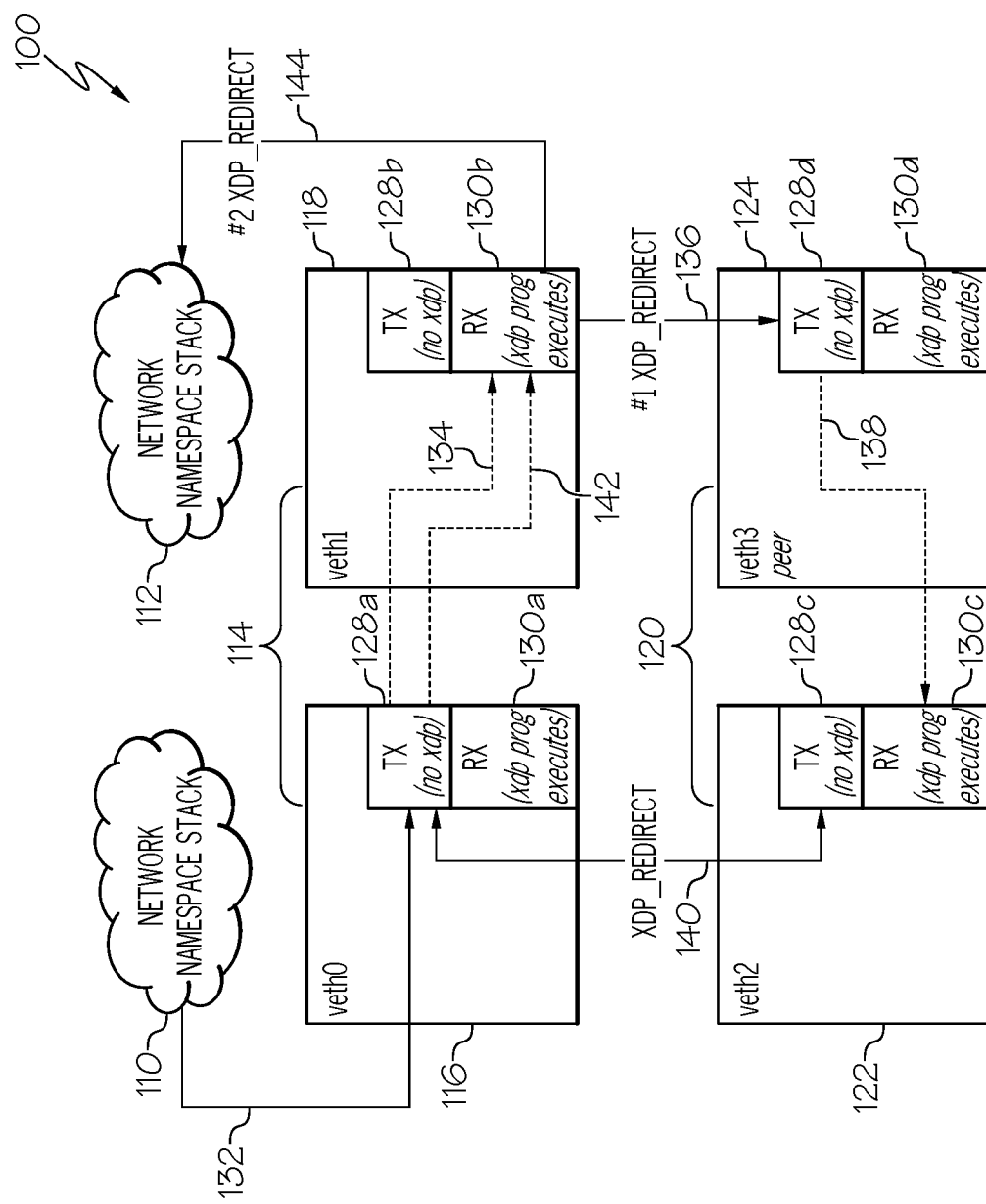
FIG. 1 depicts a packet redirection computer system architecture having virtual ethernet device pairs, in accordance with an example embodiment.

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

Embodiments herein are directed to a dataplane framework that provides the ability to intelligently and flexibly chain multiple userspace Xstream Packet Interface (XPI) services, such as an Open Policy Agent (OPA), a Deep Packet Inspection Engine (DPIE), and kernel plugins into a variety of network security product environments. In one implementation, the data plane framework described herein makes use of express datapath (XDP) programs and is usable, for example, on any Linux platform with an extended Berkley Packet Filter (eBPF)-supported kernel. In other implementations, the data plane framework described herein may be used for other data plane and userspace transport technologies such as Data Plane Development Kit (DPDK).

Thus, the data plane framework described herein provides the ability to use an unmodified operating system kernel, such as the Linux kernel, to redirect traffic to a variety of customized network services, both in userspace and in-kernel, while still maintaining good performance. Services may be chained together dynamically and interchangeably on a per-flow and per-packet level, providing flexibility in the security policies that can be applied across the packet redirection system.

The packet redirection computer systems described herein provide numerous advantages. For example, a unique set of network services may be chained, for example, for a particular flow and modified per packet if and when any of the chained services decides that more inspection is necessary. As described herein, chained services can cooperate to work more effectively by sharing metadata with each other. In this manner, the data plane framework may not be required to dictate what information can be shared between services. New network services can be introduced into an existing product deployment without traffic interruption, as contemplated herein. For example, the data plane framework described herein may not require traffic to be stopped in order to introduce new network services. Further, the data plane framework described herein can be utilized in cloud-based products and physical devices uniformly, in which case similar policies can be shared across multiple products cooperating and providing better protection across a customer's portfolio of network security or IT products.

Referring now to the Figures, FIG. 1 depicts a packet redirection computer system architecture 100 having virtual ethernet device pairs, in accordance with an example embodiment. The computer packet redirection system architecture 100 includes a first network namespace stack 110 and a second network namespace stack 112. The packet redirection computer system architecture 100 further includes a first veth pair 114 that includes a first peer, veth0 116, and a second peer, veth1 118. The packet redirection computer system architecture 100 further includes a second veth pair 120 that includes a first peer, veth2 122, and a second peer, veth3 124. Each of the peers 116, 118, 122, 124 includes two rings: a TX ring 128a, 128b, 128c, 128d, respectively, and an RX ring 130a, 130b, 130d, 130e, respectively. The TX rings 128a, 128b, 128c, 128d may be a ring in which a socket may send data packets, while the RX rings 130a, 130b, 130d, 130e may be a ring in which a socket may receive packets. It should be understood that an RX or TX descriptor ring points to a data buffer in a memory area (ie a UMEM). An RX and TX ring for a given peer may share the same UMEM so that a packet does not have to be copied between RX and TX.

At a high level, the packet redirection computer system architecture 100 makes use of the Linux eXpress datapath (XDP) to intercept packets before they are passed into the Linux kernel network stack. XDP provides an early eBPF hook point in the Linux kernel network stack. In broad overview, when a packet is received, the eBPF program (or a series of eBPF programs) attached to the XDP hook point processes the received packet and renders a verdict. The verdict may be to drop the packet while logging a tracepoint exception (e.g., XDP_ABORTED), drop the packet silently (e.g., XDP_DROP), to allow the packet to pass to the network stack (e.g., XDP_PASS), to transmit the packet back out of the same interface it was received on (e.g., XDP_TX), or to redirect the packet to another interface or userspace AF_XDP socket. A redirection may transmit the packet directly out of the targeted interface without being processed by the network stack. Likewise, transmitting the packet directly out of the same interface it was received on will also be completed without the packet being processed by the network stack.

Embodiments of the packet redirection computer system architecture 100 may exemplarily be operable on three different levels, each hooking in earlier in the packet processing path. In generic mode (skb) provided by the Linux kernel, this may be supported by all drivers. In driver mode (native), an earlier hook point may be possible but may further require driver support. In hardware offload mode (hw), hardware and driver support may be required to achieve even further upstream hook points.

As contemplated, XDP security programs in the present systems may execute (e.g., may only execute) when a packet is received on a veth (virtual ethernet pair) interface. Thus, the behavior of veth interfaces provides for an architecture or data plane framework which allows for execution of an XDP security program even when a packet is transmitted because the peer device of the transmitting veth interface will receive the same packet again. As shown in FIG. 1, it is possible to intercept a packet from one veth pair, redirect it to another veth pair, and have an XDP security program execute on the same packet. At this point, the packet may be redirected back to the original veth pair again without the network stack knowing that the packet was intercepted and passed through a custom eBPF program logic (for example) first.

As shown in FIG. 1, a data packet is first received from the network namespace stack 110 by the first peer, veth0 116, of the first veth pair 114 via a transmission 132. Without executing an XDP intercept, the TX ring 128a of the first peer, veth0 116, of the first veth pair 114 provides the data packet to the second peer, veth1 118, via a transmission 134. Upon receiving the packet by the second peer, veth1 118, an XDP redirect program executes, redirecting the data packet via a transmission 136 to the second peer, veth3 124, of the second veth pair 120. Once received by the second peer, veth3 124, the TX ring 128d of the second peer, veth3 124, of the second veth pair 120 provides the data packet to the first peer, veth2 122, of the second veth pair 120 via a transmission 138, without executing an XDP intercept. Once received by the first peer, veth2 122, of the second veth pair 120, an XDP redirect program executes, redirecting the data packet via a transmission 140 back to the first peer, veth0 116, of the first veth pair 114. This XDP redirect program may tag, attach, or otherwise alter the data packet with metadata which is detectable by the XDP security program executed by the second peer, veth1 118, of the first veth pair 114. From here, the data packet is once again received by the first peer, veth0 116, of the first veth pair 114, and without executing an XDP intercept, the TX ring 128a of the first peer, veth0 116, of the first veth pair 114 provides the data packet to the second peer, veth1 118, via a transmission 142. Now that the data packet has traversed through the second veth pair 120 and has appropriate metadata confirming or demonstrating this path, when the second peer, veth1 118, of the first veth pair 114 executes the XDP security program, the data packet passes through to the second network namespace stack 112 via a transmission 144.

In staying consistent with the principles described hereinabove with the packet redirection computer system architecture 100, embodiments contemplated herein provide an opportunity to redirect a data packet effectively to any endpoint, including a userspace application via the AF_XDP socket bound to another interface, so long as it is possible to redirect the data packet back into the original veth pair again when processing is complete.

As described herein, embodiments of the systems contemplated herein may include the following three components. First, a dataplane, which is implemented as one or more XDP security programs, attached to various socket interfaces used to configure one or more network devices, such as the Linux netdevice interface. Second, a userspace C library (e.g., libxpi) providing userspace applications packet access along with other control panel coordination. Third, an agent which facilitates various control plane functions and provides diagnostic information about the framework. The following description provides examples of various designs in the context of specific configurations (e.g., container native and physical NIC interface use cases), but the concepts herein are not limited by way of any specific implementation.

Figure 2:
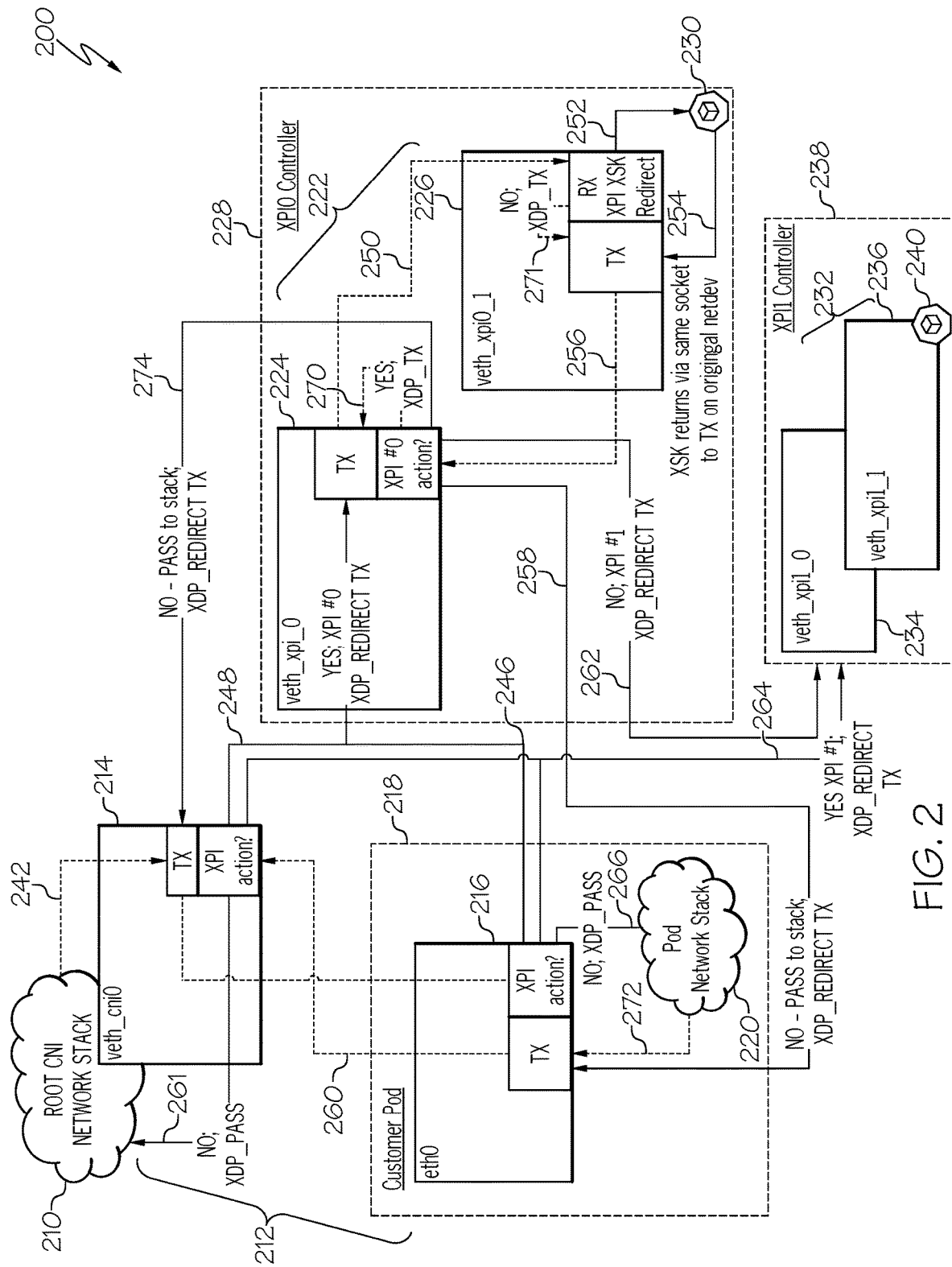
FIG. 2 depicts a containerized packet redirection computer system architecture having virtual ethernet device pairs, in accordance with an example embodiment.

FIG. 2 depicts a containerized packet redirection computer system architecture 200 having virtual ethernet device pairs, in accordance with an example embodiment. The containerized packet redirection computer system architecture 200 includes a container network interface (CNI) having a Root CNI Network Stack 210. The containerized packet redirection computer system architecture 200 includes a first veth pair 212 that includes a first peer, veth_cni0 214, and a second peer, eth0 216. While veth_cni0 214 may be a peer associated with the CNI, the eth0 216 peer may be located in a containerized customer pod 218, upstream from a Pod Network Stack 220.

The containerized packet redirection system architecture 200 further includes a second veth pair 222 which includes a first peer, veth_xpi0_0 224, and a second peer, veth_xpi0_1 226. The second veth pair 222 may be contained within another containerized pod environment, XPI0 Controller 228. Moreover, a particular Xstream Packet Interface (XPI) service program 230, such as an open policy agent (OPA) or Deep Packet Inspection Agent (DPIE), is shown connected directly to the second peer veth_xpi0_1 226 of the second veth pair 222.

The containerized packet redirection system architecture 200 further includes a third veth pair 232 which includes a first peer, veth_xpi1_0 234, and a second peer, veth_xpi1_1 236. Like the second veth pair 222, the third veth pair 232 may be contained within another containerized pod environment, XPI1 Controller 238. Moreover, an XPI service program 240 is shown directly connected to the second peer, veth_xpi1_1 236, of the third veth pair 232. While not shown in the same detail as the XPI0 Controller 228, it should be understood that the XPI1 Controller 238 architecture may be the same or similar as the XPI0 Controller 228.

As shown, a data packet originating from the Root CNI Network Stack 210 is received by the first peer, veth_cni0 214 of the first veth pair 212. Without executing an XDP action, the first peer, veth_cni0 214 immediately transmits the packet to the second peer, eth0 216 of the first veth pair 212. The second peer, eth0 216, then determines whether an XPI action should be executed. Based on the XPI action, the data packet may be transmitted along a variety of different paths, depending on the inspection results of the data packet by the XPI action. For example, the data packet may be redirected along a transmission path 246 to the XPI0 Controller 228 containerized pod environment for processing through the XPI service program 230, where the action itself is executed. Alternatively, the data packet may be redirected along a transmission path 264 to the XPI1 Controller 238 containerized pod environment for processing through the XPI service program 240. Still further, the data packet may be redirected along a transmission path 266 to the Pod Network Stack 220.

Transmission decisions by the first peer, veth_cni0 214 of the first veth pair 212 may be made based on metadata prepended or appended to any received data packet, as described herein below. The containerized pod environments, XPI0 Controller 228 and XPI1 Controller 238 may each be configured to process a data packet through an XPI service program, such as the service programs 230, 240. Each veth pair in the containerized packet redirection computer system architecture 200 may be configured to process a data packet through a single one service program, which may perform various scanning, security, inspection, or other processing of the data packet, and may further include appending or prepending the data packet with metadata which may provide an indication to other veth pairs and/or peers that the packet has been processed by a particular service program.

Continuing with the example of the data packet being sent via the transmission path 244 to the second peer, eth0 216 of the first veth pair 212, the data packet may be sent from the second peer, eth0 216 of the first veth pair 212 to the first peer, veth_xpi0_0 224 of the second veth pair 222, via the transmission path 246 and a continuing transmission path 248. From here, the TX ring of the first peer, veth_xpi0_0 224 of the second veth pair 222 transmits the packet directly to the second peer, veth_xpi0_1 of the second veth pair 222 via transmission path 250. At the second peer, veth_xpi0_1 of the second veth pair 222, an XSK redirect of the data packet is conducted, whereby the data packet is provided, via a transmission path 252, to the XPI service program 230 for processing. Once processed, the data packet is then provided back to the second peer, veth_xpi0_1 of the second veth pair 222 via a transmission path 254 to the same socket. From here, the transmission ring TX of the second peer, veth_xpi0_1 of the second veth pair 222 provides the data packet back to the first peer, veth_xpi0_0 224 of the second veth pair 222, via transmission path 256. From here, the data packet may be provided back to the customer pod 218 via transmission path 258.

Once received by the first peer, veth_xpi0_0 224 of the second veth pair 222, the data packet may alternatively or additionally be further redirected along transmission path 262 to the XPI1 Controller 238 for processing by another XPI service program 240. This may occur when the XPI program of the first peer, veth_xpi0_0 224 of the second veth pair 222 determines that no further processing is needed by the XPI service program 230 of the second veth pair 222 and/or if the data packet has metadata which makes redirection to the XPI1 Controller 238 appropriate. This could occur either after the processing by the XPI service program 230, or if the XPI action of the first peer, veth_xpi0_0 224 of the second veth pair 222 determines that the data packet should be redirected immediately to the XPI1 Controller 238, for example.

In an alternative possibility, once received by the first peer, veth_xpi0_0 224 of the second veth pair 222, the data packet may alternatively or additionally be further redirected along transmission path 270 back to be transmitted via path 250 toward the second peer veth_xpi0_1 of the second veth pair 222 for additional processing by the service program 230. Thus, the transmission path 270 shows that a data packet may be processed multiple times by the same XPI service program, if appropriate. Similarly, once received by the second peer, veth_xpi0_1 226, it may be determined via logic 271 that the data packet should be transmitted back to the first peer, veth_xpi0_0 224 without processing.

In still another alternative, possibility, once received by the first peer, veth_xpi0_0 224 of the second veth pair 222, the data packet may be redirected back to the container network interface via a transmission path 274, should no processing by the XPI0 Controller 228 and the service program 230 thereof, be necessary. Again, whatever path the data packet takes once received by the first peer, veth_xpi0_0 224 of the second veth pair 222 may be determined by the XPI action thereof based on metadata associated (prepended or appended) to the data packet, as described herein below. Moreover, packets received from the Pod Network Stack 220 via transmission path 272 may further be processed by the containerized packet redirection computer system architecture 200, and the service programs 230, 240 thereof, using the same concepts as those received from the root CNI Network Stack 210.

Once the data packet is transmitted back to the second peer, eth0 216 of the customer pod 218, the data packet may be passed to the Pod Network Stack 220 via the transmission path 266. Thus, the data packet may be passed through an XDP security program prior to sending the data packet to the Pod Network Stack 220. The data packet may be classified as acceptable based on a user rule applied by the XDP security program or programs within the containerized packet redirection computer system architecture 200 before passing the data packet through to the Pod Network Stack 220.

Additionally or alternatively, the data packet may be sent back to the first peer, veth_cni0 of the first veth pair 212, via the transmission path 260 and then provided to the Root CNI Network Stack 210 via the transmission path 261.

Figure 3:
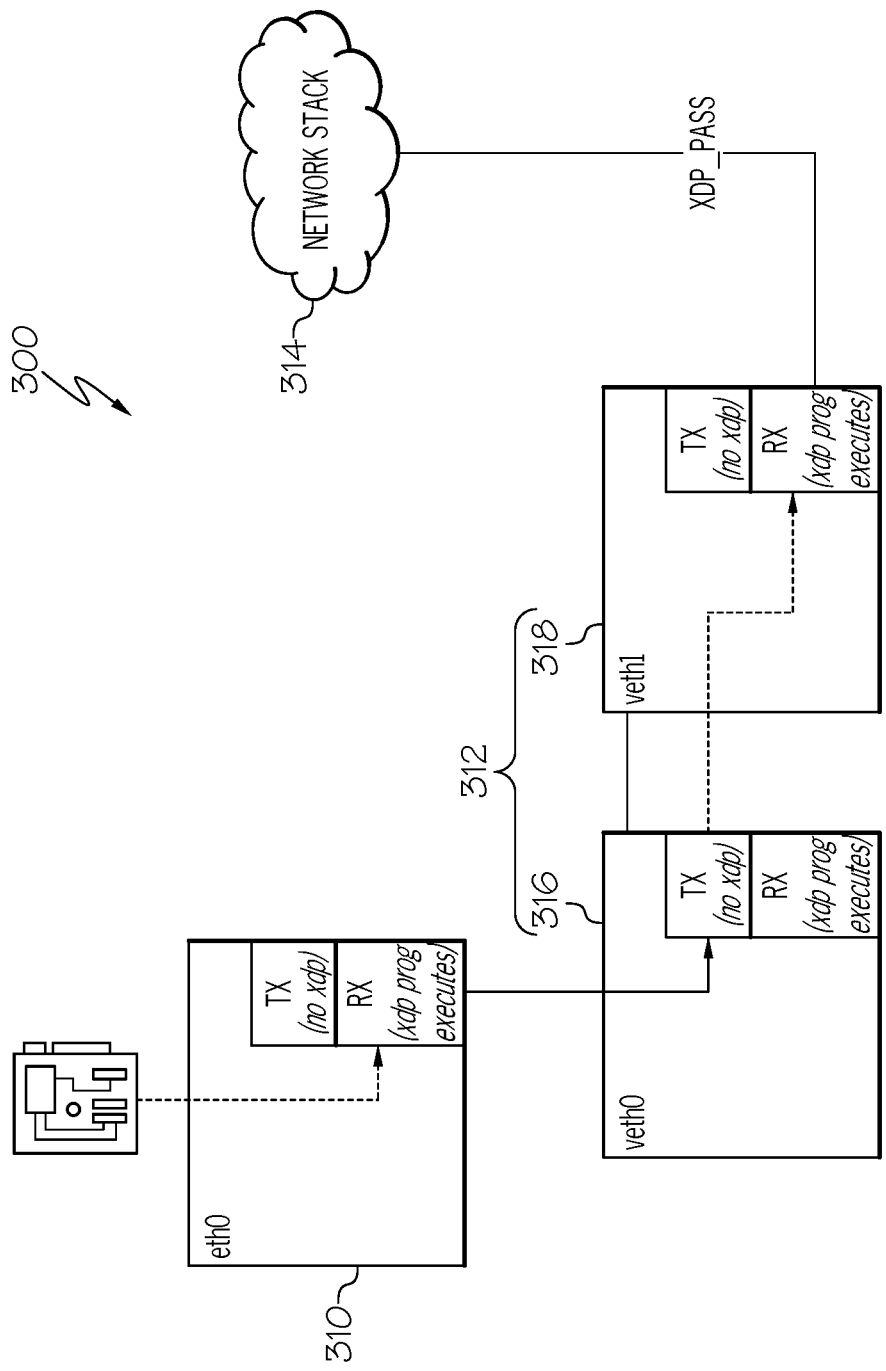
FIG. 3 depicts a packet redirection computer system architecture having a physical network interface with a virtual ethernet device pair located upstream from a network stack, in accordance with an example embodiment.

The above-described containerized design may be extended beyond container-native use cases if one wraps a physical network interface with a veth pair before the network stack. For example, FIG. 3 depicts a packet redirection computer system architecture 300 having a physical network interface card (NIC) interface 310 with a virtual ethernet device pair 312 located downstream from the physical NIC interface 310 and upstream from a network stack 314, in accordance with an example embodiment. The packet redirection computer system architecture 300 with the physical NIC may work the same as the packet redirection computer system architecture 200 which is containerized—however, the packet is received by the physical NIC device rather than a containerized network interface, as shown in the previous embodiment. While only one veth pair 312 is shown having a first peer, veth0 316, and a second peer veth1 318, additional veth pairs may be deployed for running various service programs on a data packet, as shown in FIG. 2, and further shown in FIG. 4 herein below.

Figure 4:
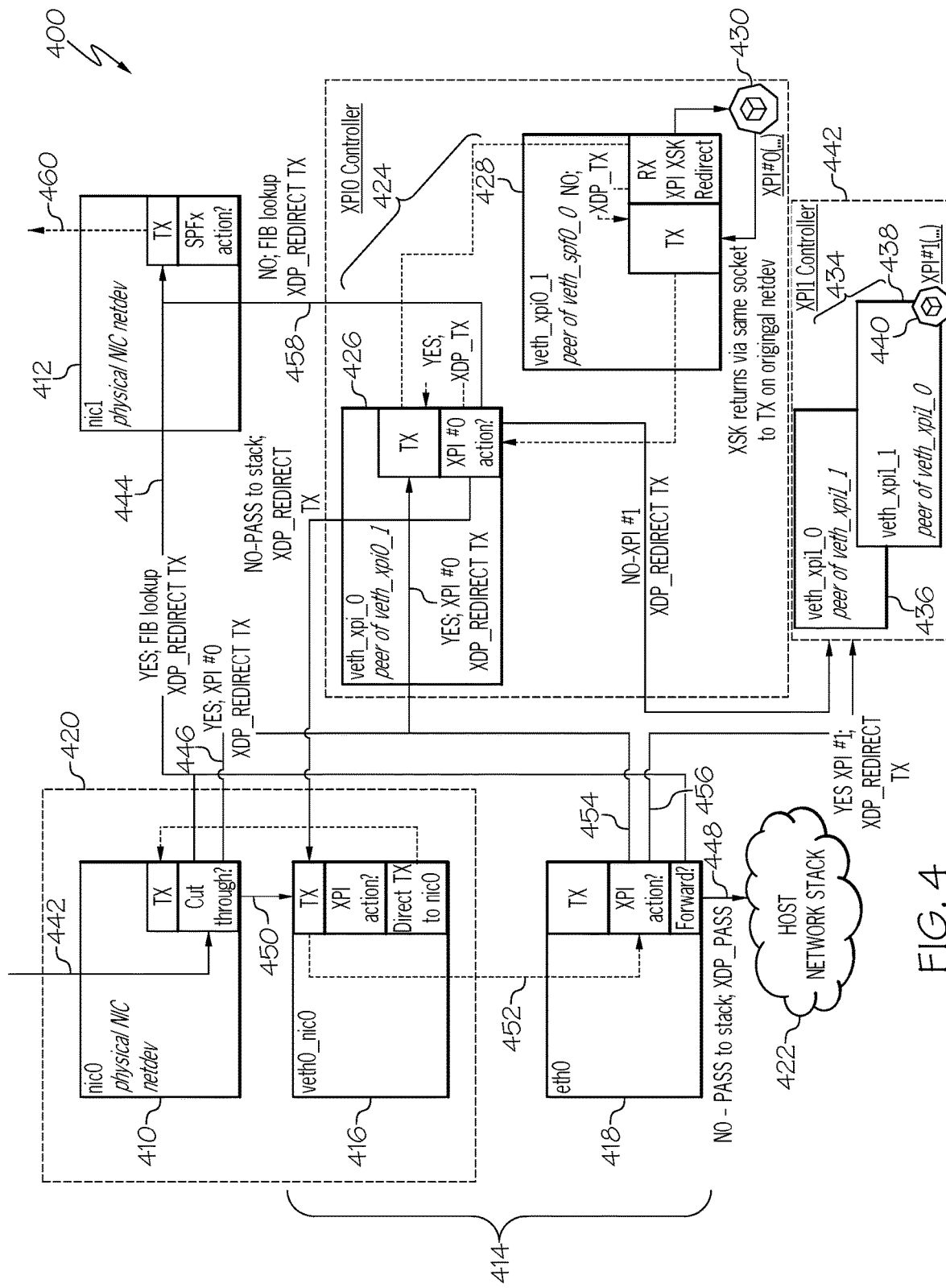
FIG. 4 depicts a packet redirection computer system architecture using physical network interfaces and containerized applications, in accordance with an example embodiment.

FIG. 4 depicts a packet redirection computer system architecture 400 using both physical network interfaces and containerized applications, in accordance with an example embodiment. As shown, the packet redirection computer system architecture 400 includes a first physical NIC device 410 and a second physical NIC device 412 communicably connected to each other. The first physical NIC device 410 is contained and/or hidden within a network namespace 420 with a first peer, veth0_nic0 416 of a first veth pair 414. While shown in the Figure, such a network namespace may be an optional feature of the packet redirection computer system architecture 400. The first veth pair 414 further includes a second peer, eth0 418, which is communicably coupled to the first peer, veth0_nic0 416, but located outside the network namespace 420. A Host Network Stack 422 is shown operably connected to the second peer, eth0 418. Thus, the first physical NIC device 410 may be a hardware device which includes the software structure for a veth pair loaded thereon in a memory device of the first physical NIC device 410. One of the peers, such as the second peer eth0 418, may include the IP address residing with network configurations for the first veth pair 516.

The packet redirection computer system architecture 400 further includes a second veth pair 424 which includes a first peer, veth_xpi0_0 426, and a second peer, veth_xpi0_1 428. The second veth pair 424 may be contained within another containerized pod environment, XPI0 Controller 432. Moreover, a particular Xstream Packet Interface (XPI) service program 430, such as an Open Policy Agent (OPA) or a deep packet inspection agent (DPIE), is shown connected directly to the second peer, veth_xpi0_1 428, of the second veth pair 424.

The packet redirection computer system architecture 400 further includes a third veth pair 434 which includes a first peer, veth_xpi11_0 436, and a second peer, veth_xpi1_1 438. Like the second veth pair 424, the third veth pair 434 may be contained within another containerized pod environment, XPI1 Controller 442. Moreover, an XPI service program 440 is shown directly connected to the second peer, veth_xpi1_1 438, of the third veth pair 232. While not broken out in the same detail as the XPI0 Controller 432, it should be understood that the XPI1 Controller 442 architecture may be the same or similar as the XPI0 Controller 432.

As shown, a data packet originating outside the packet redirection computer system architecture 400 is sent to the first physical NIC device 410 via a transmission path 442. The first physical NIC device 410 may intercept the data packet in order to determine whether a cut-through or fast path is appropriate—e.g., if a data packet is immediately determined by the first physical NIC device 410 to be good or otherwise not dangerous or otherwise qualifies for forwarding and without security processing in accordance with the methods for redirecting packets described herein. If a shortcut or more direct path (e.g., a cut through) is determined to be appropriate by the first physical NIC device 410, the data packet may be transmitted directly to the second physical NIC device 412 via a transmission path 444. A cut through determination by the first NIC device 410 may alternatively or additionally send the data packet directly to the second peer, eth0 418 of the first veth pair 414 via transmission path 446 for direct passing or forwarding to the Host Network Stack 422 via transmission path 448.

Alternatively, the NIC device 410 may determine that the data packet should not be subject to a cut through, pass through or fast path, and instead should be redirected and/or forwarded and sent from the NIC device 410 to the first veth pair 414 for processing by one or both of the XPI0 Controller 432 and/or the XPI1 Controller 442 and the service programs 430, 440 thereof. In this case, the data packet takes a transmission path 450 from the first physical NIC device 412 to the first peer, veth0_nic0 416, of the first veth pair 414. The first peer, veth0_nic0 416, receives the data packet and forwards the data packet to the second peer, eth0 418, of the first veth pair 414, via transmission path 452. At the second peer, eth0 418, the data packet is then processed to determine whether an XPI action would be appropriate. Processing decisions by the second peer, eth0 418 of the first veth pair 414 may be made based on metadata prepended or appended to any received data packet, as described herein below.

Should metadata in the data packet be found by the second peer, eth0 418, indicating that processing by the service programs 430, 440 would be appropriate, the second peer, eth0 418, may then provide the data packet to the XPI0 Controller 432 via a transmission path 454 and/or directly to the XPI1 Controller 442 via a transmission path 456. Processing of the data packet by the XPI0 Controller 432 and the XPI1 Controller 442 may be conducted in the same manner as the processing described herein above by the XPI0 Controller 228 and the XPI1 Controller 238 shown in FIG. 2. Either or both of the second and third veth pairs 424, 434 may further direct the data packet directly to the second physical NIC device 412 via a transmission path for returning the data packet from the second physical NIC device 412 via a transmission path 460.

Figure 5:
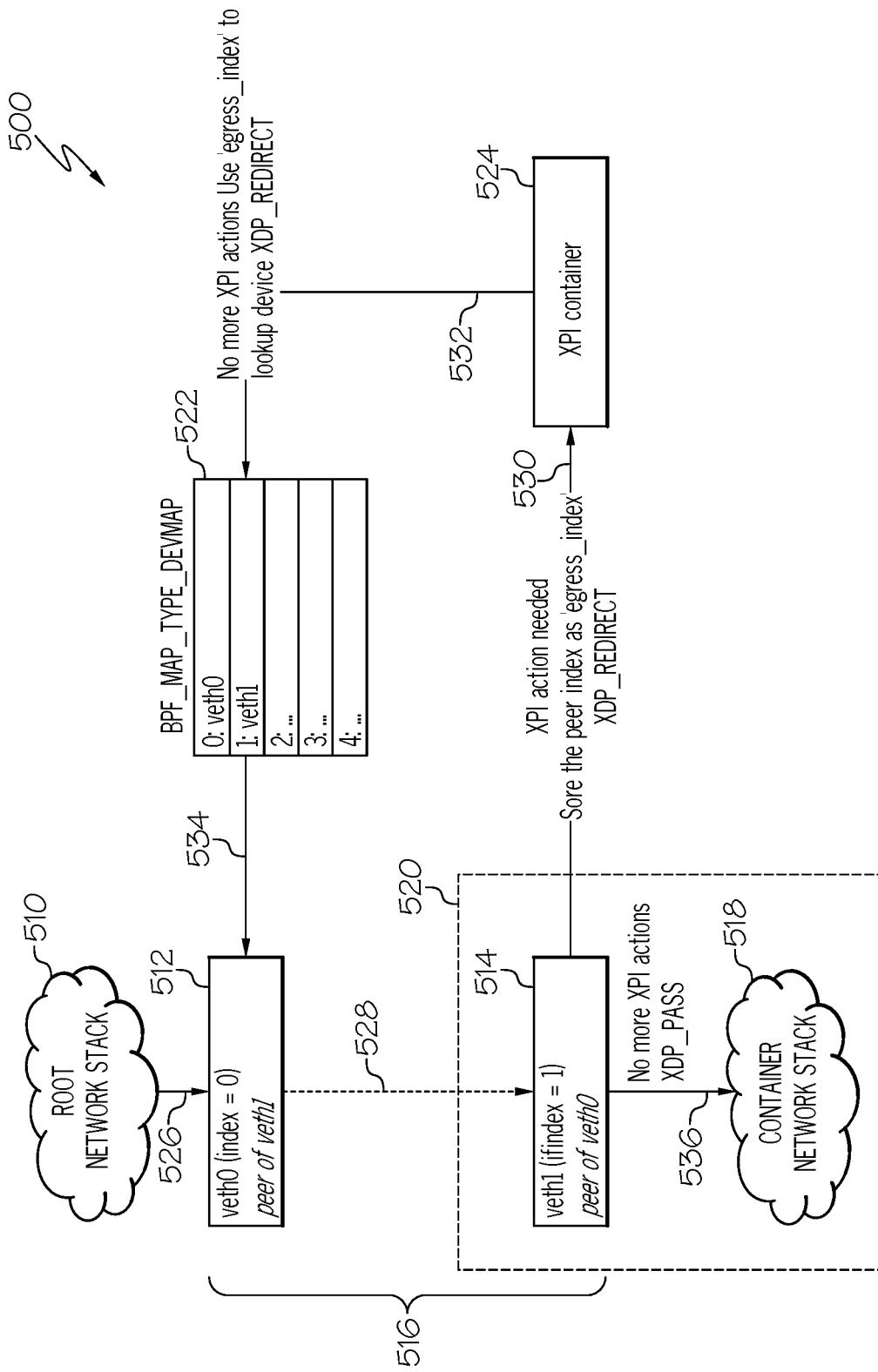
FIG. 5 depicts a containerized packet redirection computer system architecture having virtual ethernet device pairs and showing a local BPF map, in accordance with an example embodiment.

FIG. 5 depicts a containerized packet redirection computer system architecture 500 having virtual ethernet device pairs and showing a local BPF map, in accordance with an example embodiment. Packet redirects on a Linux kernel associated with the above embodiments may require one of two pieces of information—(1) an interface ifindex to a target; or (2) an index and a BPF_MAP_TYPE_DEVMAP map to lookup the targeted interface. Because an ifindex is evaluated within the network namespace that the XDP security program executes in order to determine the actual network device object, this option may not be as suitable for present applications where data packets must cross network namespace boundaries. Thus, using an index and BPF BPF_MAP_TYPE_DEVMAP map to lookup the targeted interface may be particularly appropriate if there is a pre-configured BPF_MAP_TYPE_DEVMAP map created for use for the lookup. The entries in the map may be configured from within their respective namespaces to store the reference to the appropriate network device. Such a design may use two different variants of a devmap lookup—one for a container-native use case, and the other for a physical NIC interface case.

For the container-native use case, it is possible to define a global sequence variable that gets used to allocate an index to a BPF_MAP_TYPE_DEVMAP map, which wraps after 65535 values. For each veth pair where the XDP security programs get attached, the veth pair peer index is provided in a local BPF map that is only accessible to that particular instance of an XDP security program. That peer index may then stored in the packet metadata, in the egress_index, so that the peer index may be used again later when all XPI actions have been performed to reinject the packet back to the packet's original path. The peer index may be a custom peer index which includes key and value pairs stored within packet metadata, as described herein below, and may be used in redirecting the data packets in the packet redirection computer system architecture 400.

As shown in FIG. 5, the containerized packet redirection computer system architecture 500 includes a Root Network Stack 510 connected to a first peer, veth0 512, of a first veth pair 516. The first veth pair 516 includes a second peer, veth1 514, connected to the first veth peer, veth0 512. A Container Network Stack 518 is connected to the second peer, veth1 514. The Container Network Stack 518 and the second peer, veth1 514 are contained with a containerized environment 520. An XPI container 524, which may be a service program such as the service programs described hereinabove, is coupled to the second peer, veth1 514. A BPF_MAP_TYPE_DEVMAP 522 is shown, which is associated with the first veth pair 516 and includes the peer index for the veth pair 516, as shown. The first peer, veth0 512 includes a peer index equal to 0, and the second peer, veth1 514 includes a peer index equal to 1. This peer index may be stored in the packet metadata, in the egress_index, so that it can be used again later when all XPI actions have been performed to reinject the packet back to its original path.

A data packet thus originates from the Root Network Stack 510 and is provided to the first peer, veth0 512 of the veth pair 516 via a transmission path 526. The first peer, veth0 512, then provides the data packet to the second peer, veth1 514, via a transmission path 528. The data packet is then redirected to the XPI container 524 upon receipt by the second peer, veth1 514, as the metadata associated with the packet indicates that the packet has not yet been processed by the XPI container 524. At this point, the "egress index" is stored in the packet. Once the XPI container 524 performs its action on the data packet, the "egress index" may be used to look up the device for a redirect, which will then indicate that no more XPI actions exist for further redirects to the XPI container 524.

Figure 6:
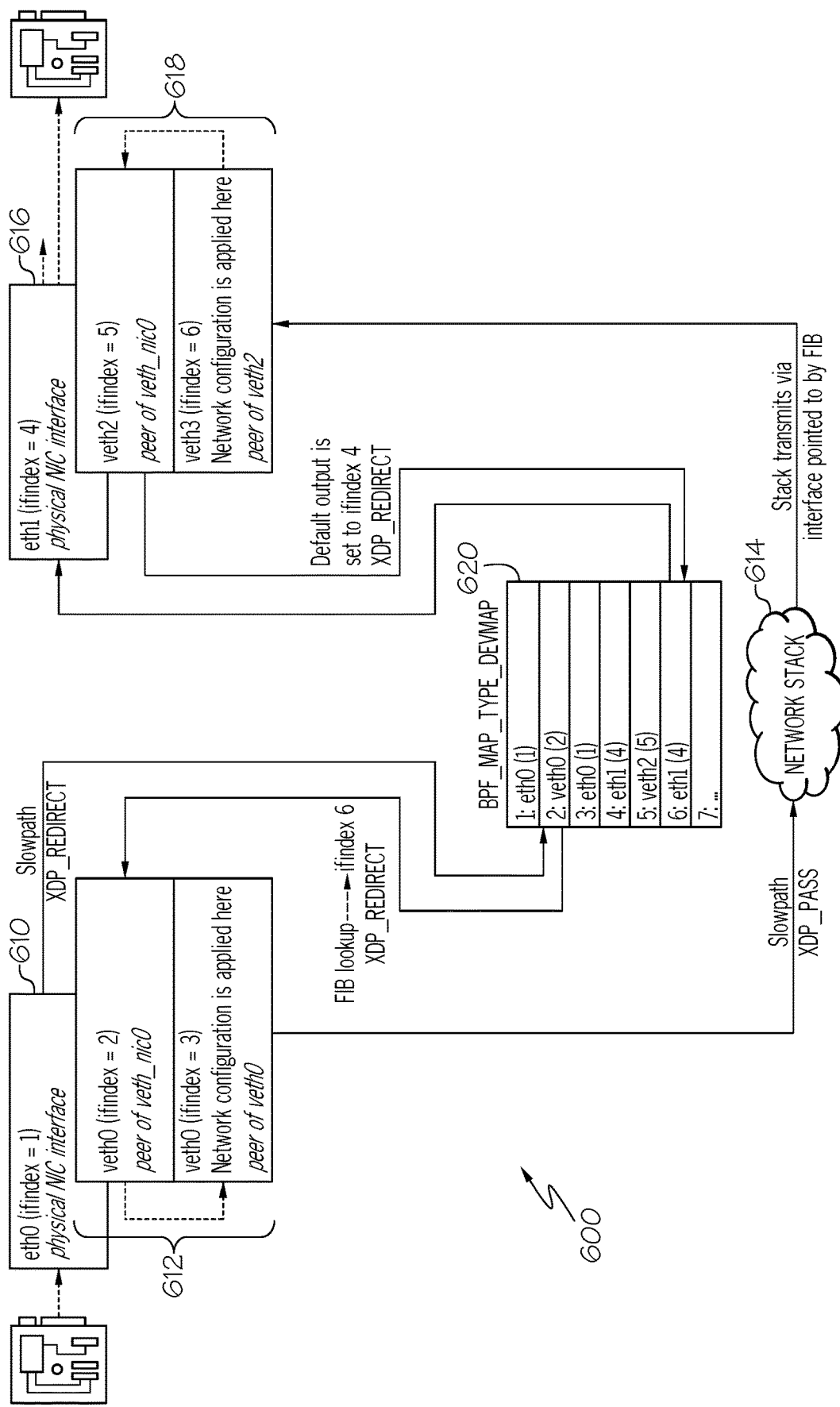
FIG. 6 depicts a schematic architecture that displays a packet path both with and without a Forwarding Information Base (FIB) lookup action, in accordance with an example embodiment.

FIG. 6 depicts a schematic architecture 600 that displays a packet path shown with and without a FIB lookup action, in accordance with an example embodiment. A variation of the embodiment shown in FIG. 5 is shown for the case where a physical NIC interface is used. In such an embodiment, the veth pair exists in the root namespace and needs to be routable so that the network stack can direct traffic to the veth interface but traffic actually flows out of the physical interface associated with that veth pair. For example, as shown the devmap is configured with the ifindedx as the index in this case. Since the number of interfaces in such a configuration is low, the ifindex can be limited to 16 bit values, in the example shown.

Each network device may be provided with an entry in the map. Many or most may point to their own reference. However, for the routable veth interface, the entry may point to their respective physical NIC netdev so that when a FIB lookup returns the ifindex to route the packet, the packet can be redirected directly out of the physical NIC netdev interface. Similar to the container case of FIG. 5, the egress_index is also used to store the final destination while actions are performed on the packet. Any number of ports can be added to this scheme, as long as the kernel is able to do a route lookup via its FIB tables.

As shown in FIG. 6, a first physical NIC device 610 is shown having a first veth pair 612. A network stack 614 is shown between the first physical NIC device 610 and a second physical NIC device 616. The second physical NIC device 616 includes a second veth pair 618. A BPF_MAP_TYPE_DEVMAP 620 is shown which includes an entry for each of the network devices 610, 612, 616, 618 shown in the architecture 600. The packet path shown may be a "slow path" with packet redirections, without a FIB lookup action being introduced. In this case, a data packet may first get redirected to veth0 from eth0, then proceed to immediately be provided to veth1, then travel through the network stack 614 into veth3, which provides the packet to veth2, and finally back to the second physical NIC device 616.

Figure 7:
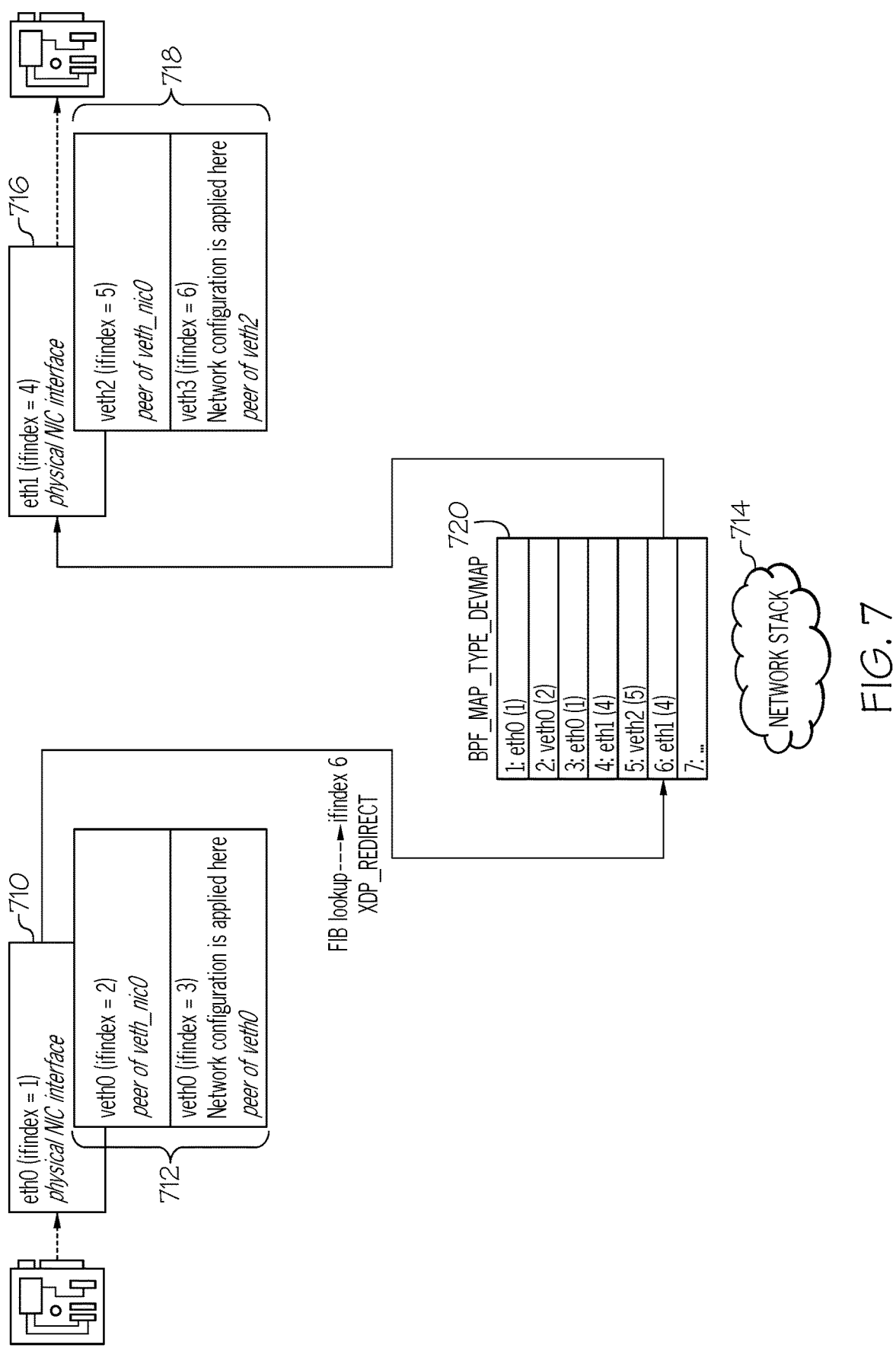
FIG. 7 depicts a schematic view of a packet path when a FIB lookup action is present, in accordance with an example embodiment.

FIG. 7 depicts a schematic architecture 700 that displays a packet path when a FIB lookup action is present, in accordance with an example embodiment. The schematic architecture 700 may be structurally the same as the architecture 600 described hereinabove. Thus, the schematic architecture 700 includes a first physical NIC device 710 is shown having a first veth pair 712. A network stack 714 is shown between the first physical NIC device 710 and a second physical NIC device 716. The second physical NIC device 716 includes a second veth pair 718. A BPF_MAP_TYPE_DEVMAP 720 is shown which includes an entry for each of the network devices 710, 712, 716, 718 shown in the architecture 700.

In this embodiment, a FIB lookup implemented as a BPF action has been introduced and performed within the XDP security program attached to eth0. Now, the FIB lookup determines that the final destination is eth1 and may redirect the packet out to that interface directly without any other intervening destinations. Since the FIB lookup is another action, it can be interleaved or otherwise included with other packet modification actions to determine a correct output. When the FIB lookup action is not present, the packet would instead travel the "slowpath" depicted in FIG. 6.

FIG. 8 depicts a metadata structure 800 with extensions, in accordance with an example embodiment. Metadata may be stored and prepended to the packet data associated with packets within the systems and architecture described herein. When the first XDP security program executes on a particular data packet, the XDP security program may be configured to check if metadata is available for the data packet. If metadata is not attached, the XDP security program may then attach the initial metadata structure to the data packet and populate the structure with information within the metadata block. This initial metadata structure may be referred herein as the "base metadata" and include various fields.

For example, a flow_hash field may be a hash based on the 5 tuple flow key for the packet, and may be 32 bits, for example. An egress_index field may indicate the devmap index this packet should be forwarded to when the pass action is processed for it, and may be 16 bits, for example. An ingress_index field may indicate the devmap index for the device the packet was originally received on, and maybe 16 bits, for example. A ttl field may indicate a time to live, and prevent packet loops, and may be 5 bits, for example. A flags field may store values simple state fields, and may be 11 bits, for example. A l3_offset field may provide L3 byte offset from the packet start, and may be 8 bits, for example. Additionally, an action_list field may provide a list of actions to apply, and may be 32 bits with optional extensions to multiples of 32 bit words, for example. While these exemplary fields, others may also be included in the base metadata.

Each data packet may also include a metadata header (e.g., a 32-bit word), or a base metadata signature. For example, this metadata signature or header may include a METADATA_MAGIC field that may be used to identify the start of a metadata block. This value could potentially clash with a MAC address on the system. To prevent such a clash or false detection, a system agent or dataplane agent may configure an appropriate METADATA_MAGIC value to use for the target node that won't clash with any configured MAC addresses on the packet redirection system. The configured value may then be made available to the eBPF program via a simple single entry array map. Another signature field may be a METADATA_TOTAL_LENGTH extension, which may define a 32 bit word length of the entire metadata structure, including the header and any extensions. The packet offset may always be determined with the metadata header pointer plus the total word length. Another possible header may be a METADATA_BASE_VERSION field which may be defined per version, initially set to a version 0. Finally, a METADATA_BASE_LENGTH may header define a 32 bit word length of the base metadata structure only, excluding the metadata magic and/or optional extensions. The packet offset may always be determined with the metadata header pointer plus the total word length.

Furthermore, embodiments disclosed herein support optional metadata extensions which can be appended to the base metadata for additional use, such as defining specific policies that need to be applied to the flow. Minimally, the metadata header may be followed by the base metadata structure; but there also may be a series of optional extensions attached after the base metadata.

As shown in FIG. 8, the metadata structure 800 includes a base metadata signature 810, a base metadata structure 820 comprising the various fields described hereinabove, along with an action list consisting of two actions. Additionally, a first metadata extension 830 is shown, which is two 32-bit words in length. Two additional metadata extensions 840*a*, 840*b* are also shown, both of which only one 32-bit word in length.

The metadata extensions may follow a variation of a TLV (type-length-value) scheme, with the addition of a version field. When a packet with metadata attached is processed, the metadata header can be used to determine the correct packet offset. In other words, a packet offset may be the current offset plus the total metadata length. The base metadata follows the metadata header and the layout is based on the version. Additional metadata extensions may then be appended to the base metadata.

The described metadata structure thereby avoids any copying when prepending more extensions—except for the metadata header which will be moved. The extensions are traversed from the base metadata toward the metadata header by reading the preceding 16 bits that contain the metadata extension signature, i.e. the type, version, and length. The traversal may end when the metadata header, which also uses the same signature structure for the base metadata, is detected.

Metadata extensions may not be interpreted by the core code of the architectures described herein but instead provided for various actions, XDP and XPI, to provide additional information for subsequent actions. However, to maintain a consolidated view across all users, the IDs, versions, and structures may need to be maintained within the code base. Some extensions may need to be stored on a per-flow basis, as described herein below.

Some common actions are provided by the framework that deployments may optionally use. For example, debugging or core packet disposition actions may be provided. Exemplary actions may also include record route action (which stores each action a packet traverses), a packet trace action (which logs packets and metadata), and a FIB lookup action (which performs a route lookup using the kernel FIB tables).

In one particular case that may be used in the containerized architectures described hereinabove, the prepended metadata may cause a packet length to exceed the maximum transmission unit (MTU) configured for the original veth interfaces generated by the CNI. XDP native metadata may not increase the packet size even though the metadata resides at the same place as the general scheme of prepended metadata. XDP native metadata is only propagated for the XDP_REDIRECT action when driver-native XDP is used.

When generic XDP is used, packet data may be passed across to other devices when redirecting. To include any metadata, the metadata may be prepended to the packet data; however, this increases the packet size and could exceed the MTU. This may become a problem when the packet has already passed through all the actions and must be passed into the kernel network stack. To work around or avoid this problem, a VLAN tag (802.1Q) may be reserved for the data packet to indicate to the packet redirection system that the data packet has already passed through all action processing and that the packet redirection system should issue the XDP_PASS verdict. To avoid security issues related to this, administrators may block any external traffic making use of this VLAN tag. For flexibility of deployment, this reserved VLAN may default, for example, to TPID=0/TCI=0, but may alternatively be configured with a global BPF map value.

Figure 9:
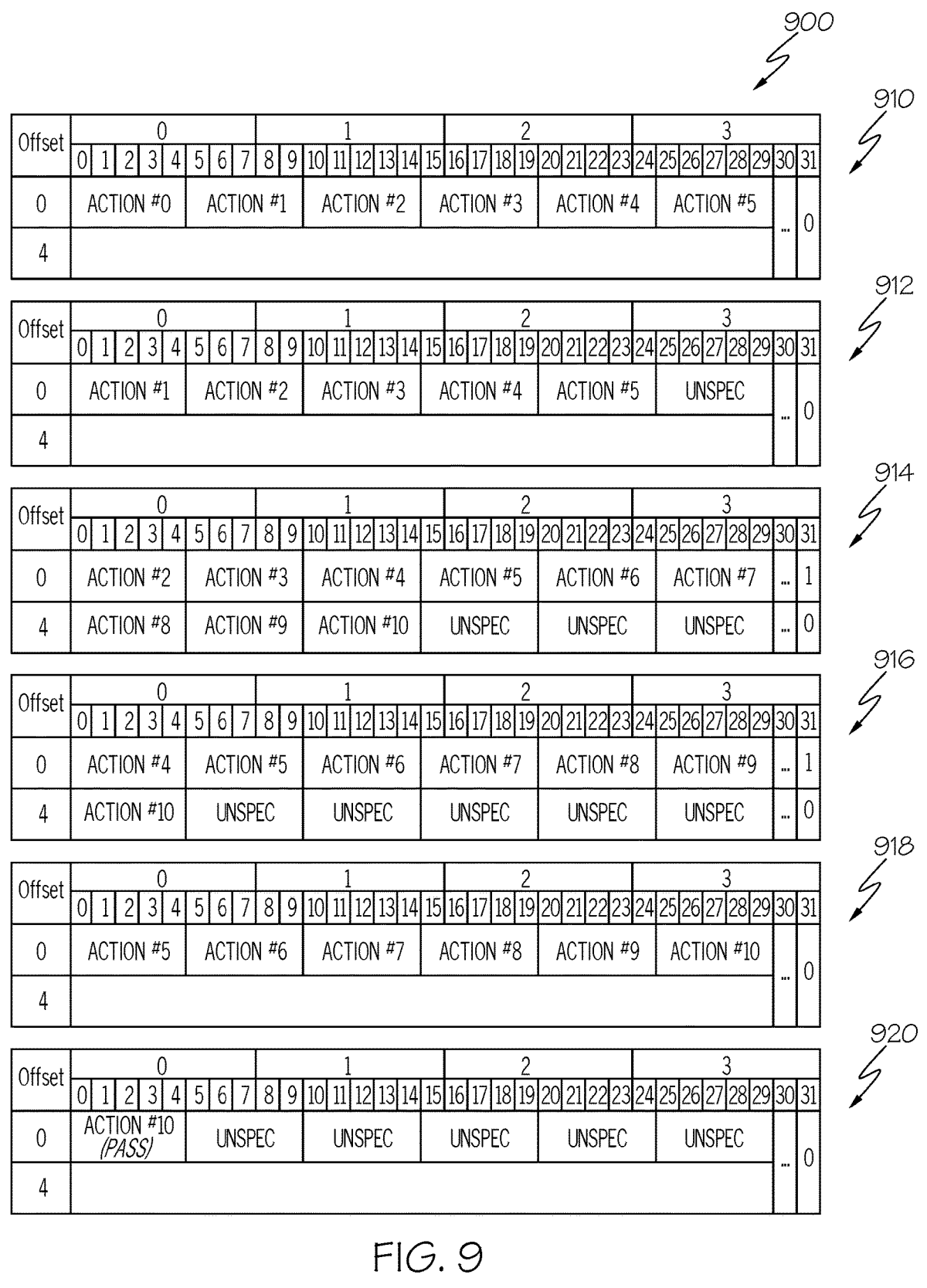

FIG. 9 depicts an action processing sequence 900, in accordance with an example embodiment. There may be various different types of actions that can be applied to each packet in accordance with the metadata instructions. For example, an action may be a simple XDP action, such as XDP_DROP or XDP_PASS. Other actions may be eBPF actions performed in-kernel as separate eBPF programs. Still other actions may be XPI actions performed in userspace as an XPI application.

The action list associated with each packet may be stored in 32 bits as part of the base metadata attached to the packet. Each consumed action may be removed from the action list so the next action to be performed will always be at offset 0. When an action is consumed, the entire action list is bit shifted. The action list may optionally be extended beyond one 32-bit word. Each extension may append another 32-bit word to the base metadata structure. The MORE bit, the MSBit, in the action list word indicates whether there is another extension after it. Each extension may itself be further extended. As actions are processed, each action list is shifted appropriately to maintain an ordered list of actions across all the extension words.

As shown in FIG. 9, the action processing sequence 900 includes a first step 910 where initially there are 6 actions assigned to a packet—thus no extension is necessary. Next, at a step 912, Action #0 is consumed and the actions shift to the left appropriately. At a step 914, Action #1 is consumed. Action #1 adds more actions and thus an extension (another bottom row) is now required. At a step 916, actions continue to be consumed, shifting extended actions into the first action list word (i.e. the top row). At a step 918, once the extension is no longer necessary, it may be removed, and the "more" bit is cleared. At a step 920, the actions continue to be consumed until all the actions are consumed. Finally, the packet must either be explicitly dropped or passed; otherwise the UNSPEC action ID will cause the packet to be dropped.

The flow cache is used to store the initial action list associated with a flow, but the action list is not fixed and can be updated at any point by any other action, e.g., the XPI application associated with action #6 is free to add a whole new set of actions to the specific packet, even though the flow cache entry will not be updated.

Reserved IDs may exist, for example, ID #0: XPDP_ACT_UNSPEC may be associated with the lack of any ID, and may result in an exception drop (i.e. XDP_ABORTED). ID #1: XPDP_ACT_DROP may be associated with an explicit drop and coincides with the value of XDP_DROP. Finally, ID #2: XPDP_ACT_PASS may allow a packet to pass on via its egress_index. There are another 29 IDs left that can be used as either XPDP eBPF actions or XPI actions. Each type of action may operate slightly differently and is described herein below. Each action can further be configured by a simple global array BPF map, indexed by the action ID, that contains a 16-bit flag value per action.

The following bits may be defined for each action ID. First, a bit XPDP_ACT_CFG_XPI indicates that an action is an XPI action. A bit XPDP_ACT_CFG_BPF indicates that the action is a BPF action. A bit XPDP_ACT_CFG_FAIL_OPEN indicates that the action allows for a fail open operation. In other words, if the application or program to handle the action isn't loaded, the action will be consumed and the next action may be executed—otherwise the packet may be dropped. A bit XPDP_ACT_CFG_EXEC_ROOTNS indicates that the action must be executed from the root network namespace only. The action may be reliant on a BPF helper that would only have the appropriate state in the root network namespace.

System eBPF actions may be implemented as BPF tail calls, accessed from a BPF_MAP_TYPE_PROG_ARRAY type map indexed with the action ID. The system agent may be responsible for loading the appropriate eBPF program into the correct index so other system programs can access it. If the tail call fails and the XPDP_ACT_CFG_FAIL_OPEN flag is set, the action will be consumed and the next action will be processed. Otherwise, the packet will be dropped.

System eBPF actions may thus assume that the packet data pointer will point to the metadata structure and may perform any XDP instructions that any other non-system XDP program would be able to. The only restriction may be that control must be returned back to the system after processing is completed, except if the packet needs to be dropped in an error condition, e.g., XDP_ABORTED. Because eBPF tail calls do not operate like functions and therefore often run to completion, the action programs may need to return program flow back to a system action processing program—provided as a system helper function. Other helper functions, e.g., to traverse metadata, are also provided.

Action ID #0 (i.e. XPDP_ACT_UNSPEC) may not be valid for legitimate actions, so it may be used to store the system action processing program, which can be accessed with an eBPF tail call.

XPI actions may be implemented as userspace processes, which gain access to the metadata and packet data via the AF_XDP socket (XSK). When an action associated with an XPI application is processed, the packet is directed to the appropriate XSK from where the userspace application may retrieve the packet. The XPI application can then choose to alter the packet data or the metadata and ultimately needs to transmit the packet back on the same XSK or drop the packet.

To ease access to the data plane, a C-library, named libxpi, may be provided which performs the configuration and management of XSK rings to access the packet data. The libxpi library may generate the XPI veth interface pair during initialization, configure the interfaces, load the appropriate XDP programs and attach it to the veth interfaces. The library may also create and configure the AF_XDP sockets as needed based on a user-provided configuration.

The XPI application may initialize the library and use APIs to fetch new packets, send received packets, drop received packets, allocate new packets, access socket statistics, lookup or modify some system BPF map values, or the like. The library also provides some interfaces to the system agent, such as interfaces for setting application status, register metadata extensions supported, retrieve policy updates, or the like.

Figure 10:
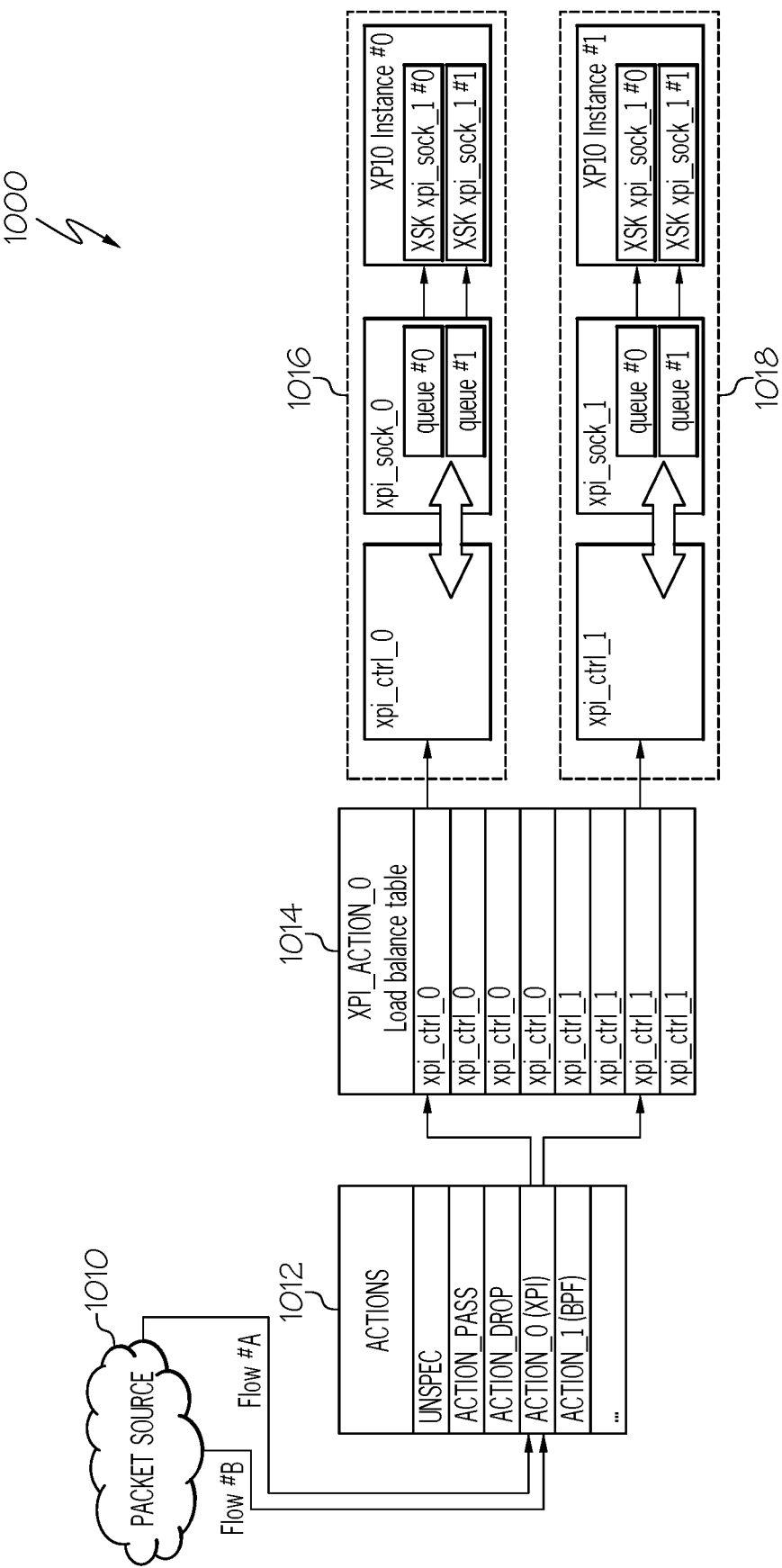
FIG. 10 depicts a schematic view of a load balancing scheme, in accordance with an example embodiment.

FIG. 10 depicts a schematic view of a load balancing scheme 1000, in accordance with an example embodiment. Each XPI application may have an XSK socket configured per queue per network device interface that has access to it, i.e., the XPI socket veth interface. In embodiments contemplated, there may be a single XSK opened for a particular interface/queue pair. Thus, in some instances, there may be no way to share one specific XSK for multiple instances of a particular XPI application. Furthermore, since each XPI application (even multiple instances of the same application) may get launched in its own process/network namespace (which is ideal for K8s deployments and management), the XPI application may only have access to the interfaces that are also contained in its network namespace. This also implies that multiple queues for the same veth interface may not be shared across multiple XPI applications running in their own containers. Thus, present embodiments contemplated herein may have a single veth pair per XPI application instance and effectively treat each separate instance as an entirely separate XPI application.

To still be able to load balance across multiple instances of the same application, packet redirection systems and architectures contemplated herein may perform the load balancing before redirecting packets to the XPI container veth pair. This may be achieved by using a BPF map-in-map to redirect to the correct XSK. The outer map may be indexed by action ID and provide a reference to the inner map, specific to the XPI application instance. The inner map, which contains the actual XSK references to redirect packets to, may be indexed by the masked flow hash stored in the packet metadata.

FIG. 10 shows the load balancing scheme 1000 having a packet source 1010 providing a flow of data packets for processing in accordance with a set of actions 1012. A load balancing table 1014 is indexed by flow hash and defined per action ID. The load balance table 1014 can be updated to remove stale entries and replace them with another active instance. The load balancing scheme shows two separate XPI application instances 1016, 1018, each having its own veth pair structure as defined by the examples provided hereinabove. In accordance with the load balancing table 1014, Flow #A, including the first four actions in the load balancing table 1014, may be processed by the first XPI application instance 1016. Flow #B, including the final four actions in the load balancing table 1014, may be processed by the second XPI application instance 1018.

The load balance table may be maintained as XPI application instances associated with a specific action ID becomes live or gets removed. The system agent may be responsible for maintaining the load balance map. The XPI application (via libxpi) may be responsible for populating its local per queue XSK map.

A multi-queue may also be supported by systems and embodiments described herein for all veth interfaces that are generated, including the XPI veth pair generated by libxpi. However, since veth interfaces do not require hardware interrupts to process packets, CPU pinning is minimized. However, there may still be some benefit to CPU cache usage to match the number of veth interface queues to the associated physical NIC interface.

The XPI veth pair may thus have a use case for multi-queue support. In such embodiments, for each queue in the XPI veth pair, a separate AF_XDP socket may be generated and bound to the queue. When the XPI application fetches new packets, libxpi may internally iterate over all available queues and provide access to each of those packets individually. If the XPI application supports multiple threads and prefers to be bound to specific CPUs, it may be beneficial to separate the processing out on queue basis. Packet redirection systems and architectures contemplated herein may balance different XSK queues based on either the flow hash. It may be best to modify the flow hash slightly for this purpose to avoid a persistent pattern when combined with the XPI load balancing function described above.

Packet redirection systems described herein may further make use of a flow cache to store the results of some classification action (or multiple). Although the framework does not require a classification action, such a classification action may be the most efficient and practical way of deploying the data plane.

The flow cache may store the action list along with some other state information for the flow in a hash map, indexed by the flow hash. The flow hash may be calculated based on the 5-tuple of the flow, ordered numerically by the source port (if the ports are equal, the source IP address may be used as the ordering key).

The flow cache may support IPv4 and IPv6 and TCP/UDP protocols. Unsupported protocols may not be stored in the flow cache. Whenever a supported packet is received, the flow cache may be queried for an active entry. If the entry exists, the action list from the entry may be applied to the packet metadata. If the entry does not exist, a new entry may be created with the default action list configured for the packet redirection system to be applied to the packet metadata.

Some metadata extensions may also need to be stored in the flow cache, e.g., customized policies. The flow cache entry may provide, for example, 24 bytes of space for this purpose.

System BPF actions or XPI actions described herein may affect the flow cache entry to some extent by signaling the packet redirection system to modify the flow cache entry in order to: overwrite the entire action list to its current version in the packet metadata (which may be signaled with a system flag); to overwrite the entire action list to another set entirely (which may be signaled with an attached metadata extension); to insert or remove a particular action in the stored action list (which may be signaled with an attached metadata extension); or to overwrite the stored metadata extensions (which may be signaled with a system flag).

The flow cache contains the information such as: a flow_key field, which may contain the 5-tuple for the flow ordered by source port and then source IP address; an action_list field, which may contain the action list stored for the flow; a timestamp field, which may contain the last update time stamp; a revision field, which may contain the flow entry revision; and/or a metadata_ext field, which may contain any metadata extensions for the flow.

Figure 11:
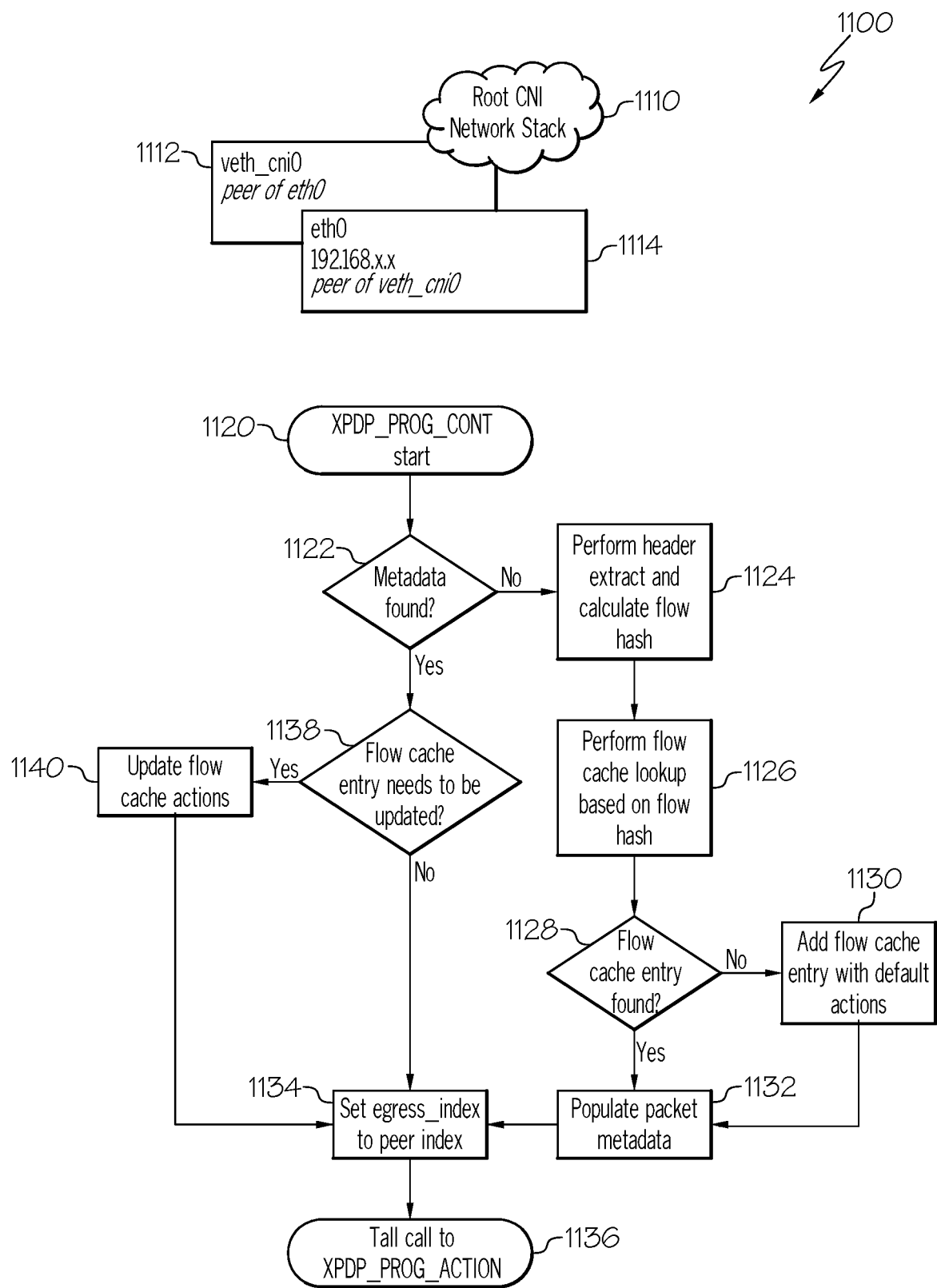
FIG. 11 depicts a container native process flowchart, in accordance with an example embodiment.

FIG. 11 depicts a container native process flowchart 1100, in accordance with an example embodiment. The flowchart shown in FIG. 11 may be implemented by one or more of the components discussed herein, and is discussed by way of reference thereto. The container native process flowchart 1100 relates to systems where a Root CNI Network Stack 1110 is connected to a first veth pair consisting of a first peer, veth_cni0 1112, and a second peer, eth0 1114, similar or the same as the container native packet redirection computer system described hereinabove and shown in FIG. 2, for example. A first step 1120 of the process is shown whereby a data packet gets transmitted by the Root CNI Network Stack 1110 via the first peer, veth_cni0 1112. The data packet then is received by the second peer eth0 1114 and the system process begins, executes or otherwise initiates.

At a next step 1122, it is determined, by for example the second peer eth0 1114, whether metadata is found in the data packet indicating that actions have already been taken on the data packet in accordance with the packet redirection system. If there is no metadata indicating the packet has already undergone processing, a next step 1124 performs header extraction and calculates a flow hash for the data packet. At a next step 1126, a flow cache lookup is performed based on the calculated flow hash for the data packet. At a next step 1128, it is determined whether a flow cache entry is found. If not, a step 1130 adds a flow cache entry with default actions, after which a step 1132 populates packet metadata for the data packet. If the flow cache entry is found at step 1128, the method moves directly to the step 1132 of populating the packet metadata for the data packet. Finally, at a step 1134, the egress_index is set to peer index and a tail call is performed at a step 1136. With the metadata populated and flow cache actions set, the packet redirection system then proceeds to process the data packet and perform the actions on the data packet, in accordance with the systems and methods described herein above and described herein below with respect to the process flow of FIG. 13.

If metadata was found at step 1122, indicating that the data packet was already processed by the packet redirection system, the process may proceed to a step 1138 to determine whether the flow cache entry for the data packet needs to be updated. If an update is needed, the flow cache actions are updated at a step 1140 and the process proceeds to the step 1134 where the egress_index is set to peer index. If the flow cache entry does not need to be updated at the step 1138, the process proceeds directly to the step 1134 of setting the egress_index to peer index.

Figure 12:
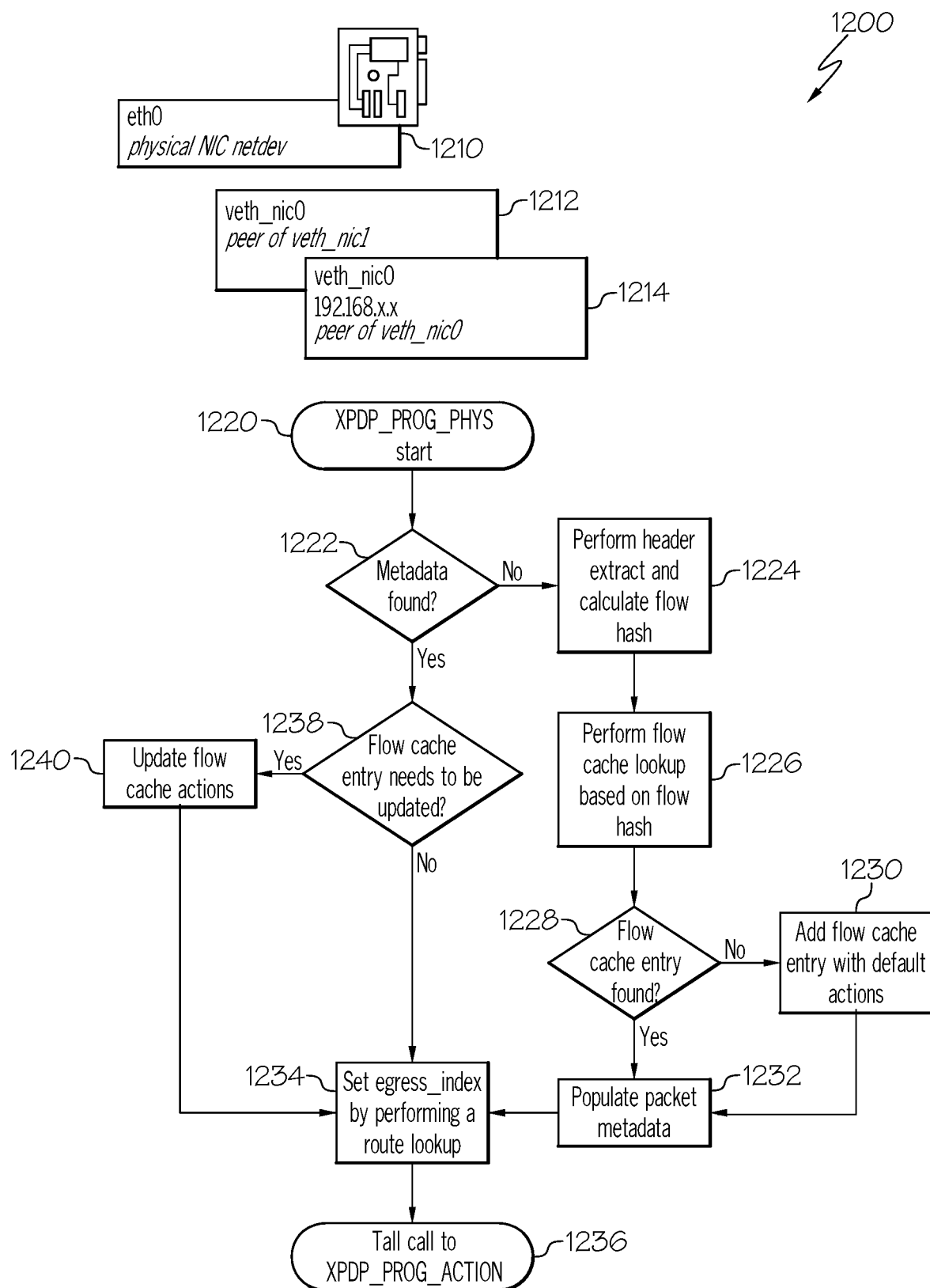
FIG. 12 depicts a physical network interface process flowchart, in accordance with an example embodiment.

FIG. 12 depicts a physical network interface process flowchart 1200, in accordance with an example embodiment. The flowchart shown in FIG. 12 may be implemented by one or more of the components discussed herein, and is discussed by way of reference thereto. The physical network interface process flowchart 1200 relates to systems where a physical NIC device 1210 is connected to a first veth pair consisting of a first peer, veth_nic0 1212, and a second peer, veth_nic1 1214, similar or the same as the physical network interface device system described hereinabove and shown in FIG. 4, for example. A first step 1220 of the process is shown whereby a data packet gets transmitted by the physical NIC device 1210 via the first peer, veth_nic0 1212. The data packet then is received by the second peer veth_nic1 1214 and the packet redirection system process begins, executes or otherwise initiates.

At a next step 1222, it is determined, by for example the second peer veth_nic1 1214, whether metadata is found in the data packet indicating that actions have already been taken on the data packet in accordance with the packet redirection system. If there is no metadata indicating the packet has already undergone processing, a next step 1224 performs header extraction and calculates a flow hash for the data packet. At a next step 1226, a flow cache lookup is performed based on the calculated flow hash for the data packet. At a next step 1228, it is determined whether a flow cache entry is found. If not, a step 1230 adds a flow cache entry with default actions, after which a step 1232 populates packet metadata for the data packet. If the flow cache entry is found at step 1228, the method moves directly to the step 1232 of populating the packet metadata for the data packet. Finally, at a step 1234, the egress_index is set to peer index and a tail call is performed at a step 1236. With the metadata populated and flow cache actions set, the packet redirection system then proceeds to process the data packet and perform the actions on the data packet, in accordance with the systems and methods described herein above and described herein below with respect to the process flow of FIG. 13.

If metadata was found at step 1222, indicating that the data packet was already processed by the packet redirection system, the process may proceed to a step 1238 to determine whether the flow cache entry for the data packet needs to be updated. If an update is needed, the flow cache actions are updated at a step 1240 and the process proceeds to the step 1234 where the egress_index is set by performing a route lookup. If the flow cache entry does not need to be updated at the step 1238, the process proceeds directly to the step 1234 of setting the egress_index by performing the route lookup.

Figure 13:
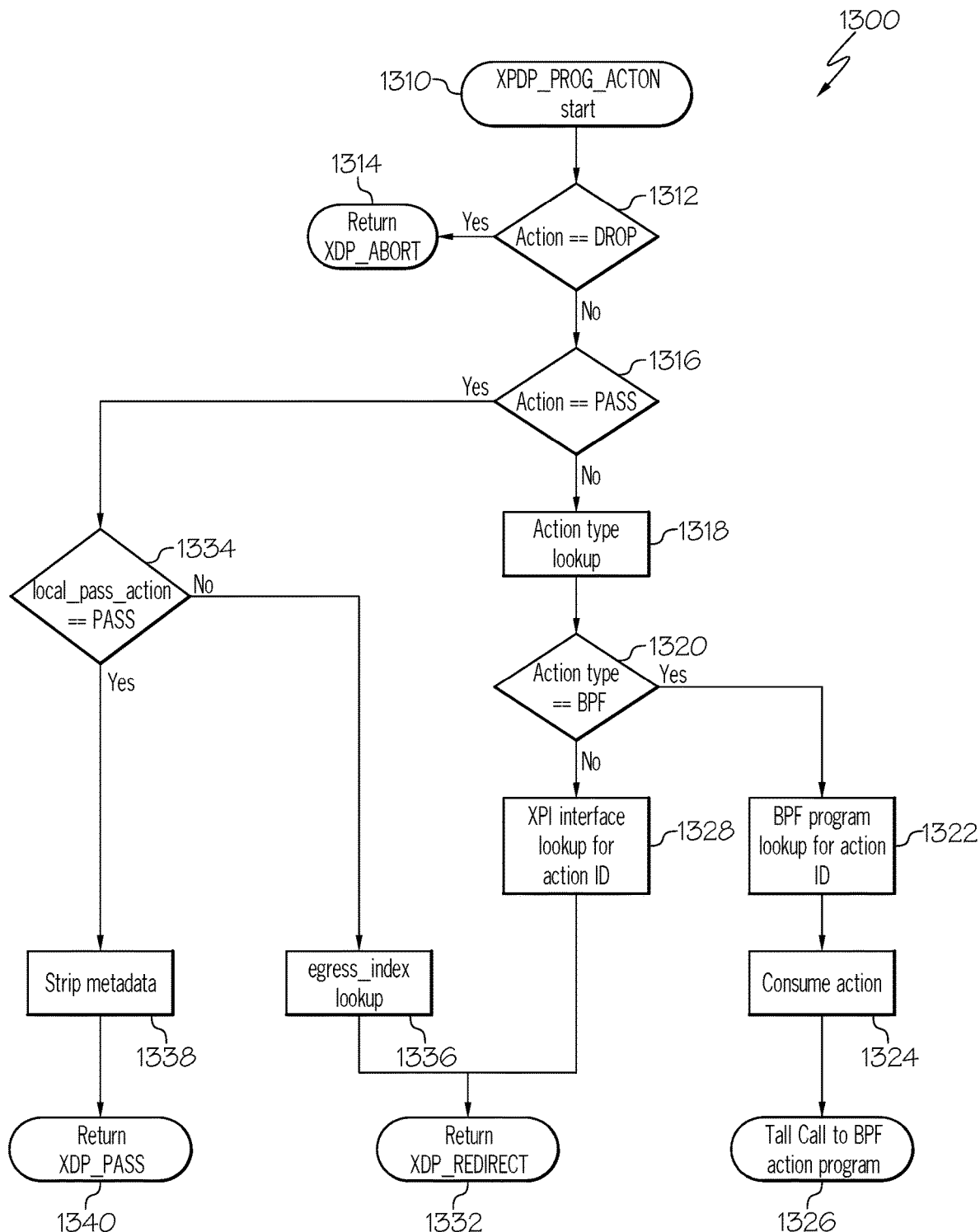
FIG. 13 depicts an action processing flowchart, in accordance with an example embodiment.

FIG. 13 depicts an action processing flowchart 1300, in accordance with an example embodiment. The flowchart shown in FIG. 13 may be implemented by one or more of the components discussed herein, and is discussed by way of reference thereto. The action processing flowchart 1300 may start at a first step 1310 which may be a continuation of either of the end steps 1136, 1236 of the processes 1100, 1200 described above. At a next step 1312 it is determined whether an action is equal to or set to drop. If yes, the packet may return XDP_DROP at a step 1314. If not, the process moves to a step 1316 where it is determined whether an action is equal to or set to pass. If not, the action type is looked up at a step 1318. The action type lookup at step 1318 determines whether the action type is a BPF action at a step 1320. If the action is a BPF type, the process proceeds to a step 1322 where a BPF program lookup for the action identification is conducted, and then proceeds to a step 1324 where the BPF action is consumed. At a final step 1326, the tail call of the BPF action program is performed. From here, another BPF program may be executed which will return control back to the packet redirection system action process once it completes, starting at the step 1310.

At step 1320 if the action type is not a BPF action, the process proceeds to a step 1328 where an XPI interface lookup for the action ID is performed. A return statement then causes the process to leave the action processing routing at a step 1332. From here, the packet may be redirected to another interface whereby the packet may be redirected to an XPI Controller, such as a first peer 1412 (shown in FIG. 14). From here, the control flow of the packet may continue to step 1438 (described herein below) which is attached to interface 1416.

If the action does pass at the step 1316, the data packet may be reviewed to determine whether the data packet passes a local pass action, at a step 1334. This local pass action may be a BPF map defined per interface that indicates whether the interface should pass or redirect packets when the pass action is processed. For example, CNI veth interfaces may always pass packets, but the XPI control interface must redirect. If the result of the determination at step 1334 is that the local pass action is passed, the metadata may be stripped from the data packet at a step 1338. Finally, a return statement then causes the process to leave the action processing routing at a step 1340. At this point, the data packet may then be passed to the network stack or routed out of the egress physical NIC interface. If the local pass action is determined to not pass at the step 1334, an egress index lookup occurs at a step 1336, whereby the data packet proceeds to the step 1332, where the data packet is redirected to another interface whereby the main action program will be once again executed starting at the step 1310.

Figure 14:
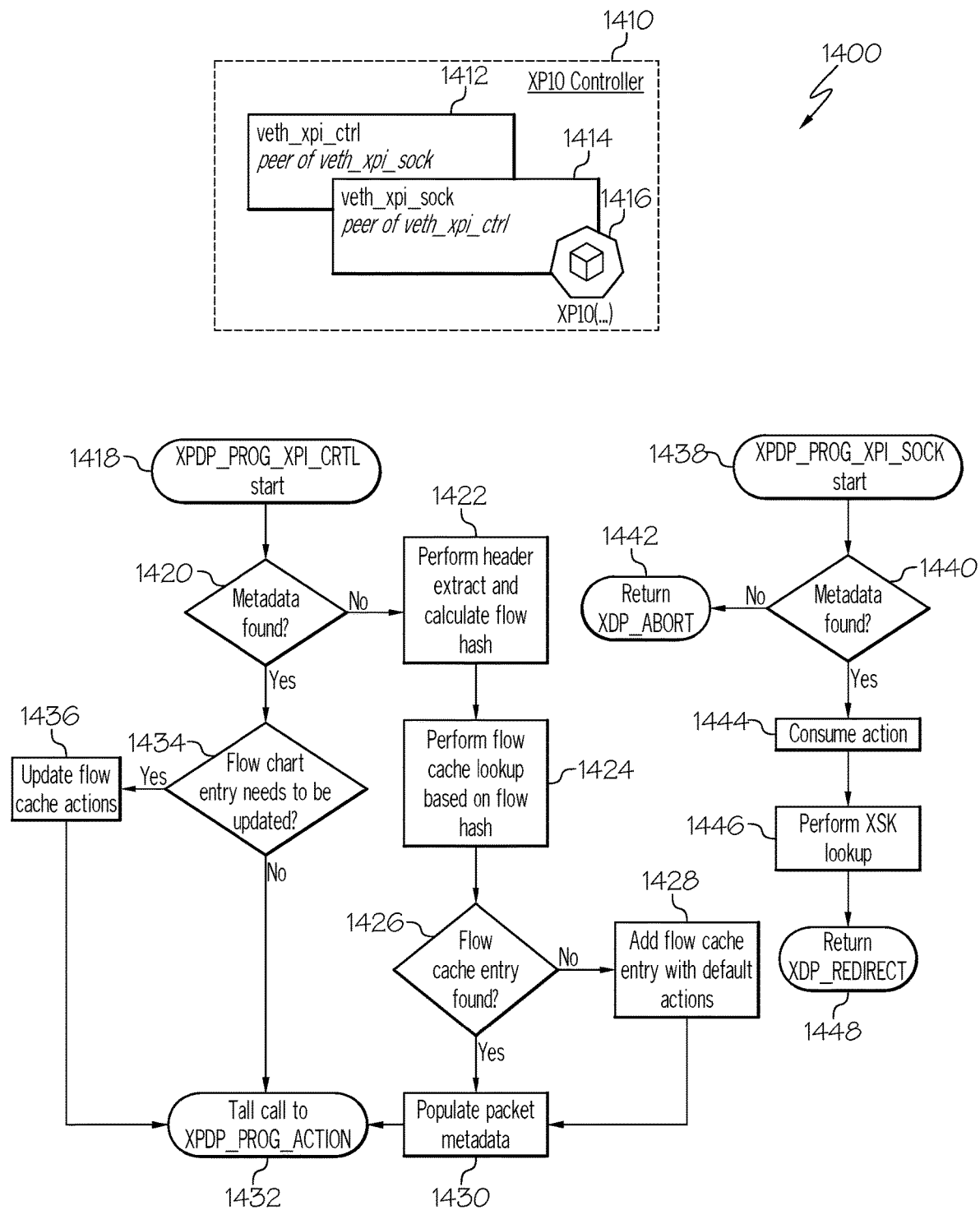
FIG. 14 depicts a packet processing flowchart using an Xstream Packet Interface (XPI), in accordance with an example embodiment.

FIG. 14 depicts a packet processing flowchart 1400 using an Xstream Packet Interface (XPI), in accordance with an example embodiment. The flowchart shown in FIG. 14 may be implemented by one or more of the components discussed herein, and is discussed by way of reference thereto. The XPI interface may be accomplished using the architecture shown having an XPI0 Controller 1410, which may be a containerized environment, for example, including a veth pair having a first peer, veth_xpi_ctrl 1412, and a second peer, veth_xpi_sock 1414 and include an XPI interface 1416. The XPI0 Controller 1410 may be the same or similar to the various containerized environments 228, 238, 432, 442 described herein above.

In the event that the data packet is received by the first peer, and the "control" variant of the program executes at a first step 1418, the data packet is inspected for metadata at a step 1420. If there is no metadata indicating the packet has already undergone processing, a next step 1422 performs header extraction and calculates a flow hash for the data packet. At a next step 1424, a flow cache lookup is performed based on the calculated flow hash for the data packet. At a next step 1426, it is determined whether a flow cache entry is found. If not, a step 1428 adds a flow cache entry with default actions, after which a step 1430 populates packet metadata for the data packet. If the flow cache entry is found at step 1426, the method moves directly to the step 1430 of populating the packet metadata for the data packet. Finally, at a step 1432, a tail call is performed.

If metadata was found at step 1420, indicating that the data packet was already processed by the packet redirection system, the process may proceed to a step 1434 to determine whether the flow cache entry for the data packet needs to be updated. If an update is needed, the flow cache actions are updated at a step 1436 and the process proceeds to the step 1432 of the tail call. If the flow cache entry does not need to be updated at the step 1434, the process proceeds directly to the tail call at the step 1432.

In the event that the data packet is received by the second peer, and the "socket" variant of the program executes at a first step 1438, the data packet is inspected for metadata at a step 1440. If there is no metadata associated with the data packet for processing, the process is aborted at a step 1442. If there is metadata for processing, the data packet action is consumed at a step 1444. An XSK lookup is then performed at a step 1446. Finally, the return statement instructs the program to leave the packet processing subroutine at the step 1448.

It is contemplated herein that a control plane system or dataplane agent may serve the purpose of coordinating across all program instances in the packet redirection systems and architectures described herein, including BPF actions, and XPI applications, for a particular node. In example embodiments, such a dataplane agent or system can be run within its own local container/pod, although this deployment method is not required. The dataplane agent may be deployed and/or controlled by a threat management system, such as the threat management system described herein below. Further, the dataplane agent may expose various public RESTful APIs for interaction with different components and users. APIs may be secured by HTTP basic authority and may only support Secure Socket Layer (SSL)/Transport Layer Security (TLS) connections.

The dataplane agent or control plane system described herein may perform various BPF map configurations for system program instances, using input from users or from XPI applications, continuously during its runtime. For example, the dataplane agent may configure an appropriate magic_value_cfg for nodes based on the current configuration of the network interfaces of a given node. The dataplane agent may configure the action_cfg BPF map for new actions registered or actions unregistered. Still further, the dataplane agent may configure the lb_map_xpi BPF map when XPI applications change state.

The dataplane agent may further be responsible for and attaching BPF actions, upon request. To accomplish this, the BPF programs may be available within the local mount space of the dataplane agent.

The dataplane agent may further be responsible for tracking all XPI applications' states. Thus, the dataplane agent provides various functions for XPI applications via APIs, such as registering and unregistering an application, setting an application status to running or stopped, or retrieving information about other XPI applications and XPDP actions that are registered (which a classifier XPI application may use to adjust its ruleset appropriately). Applications registering with the agent indicate which action ID the application wants to associate with, the type of service it provides, and which metadata version and metadata extensions are supported.

Figure 15:
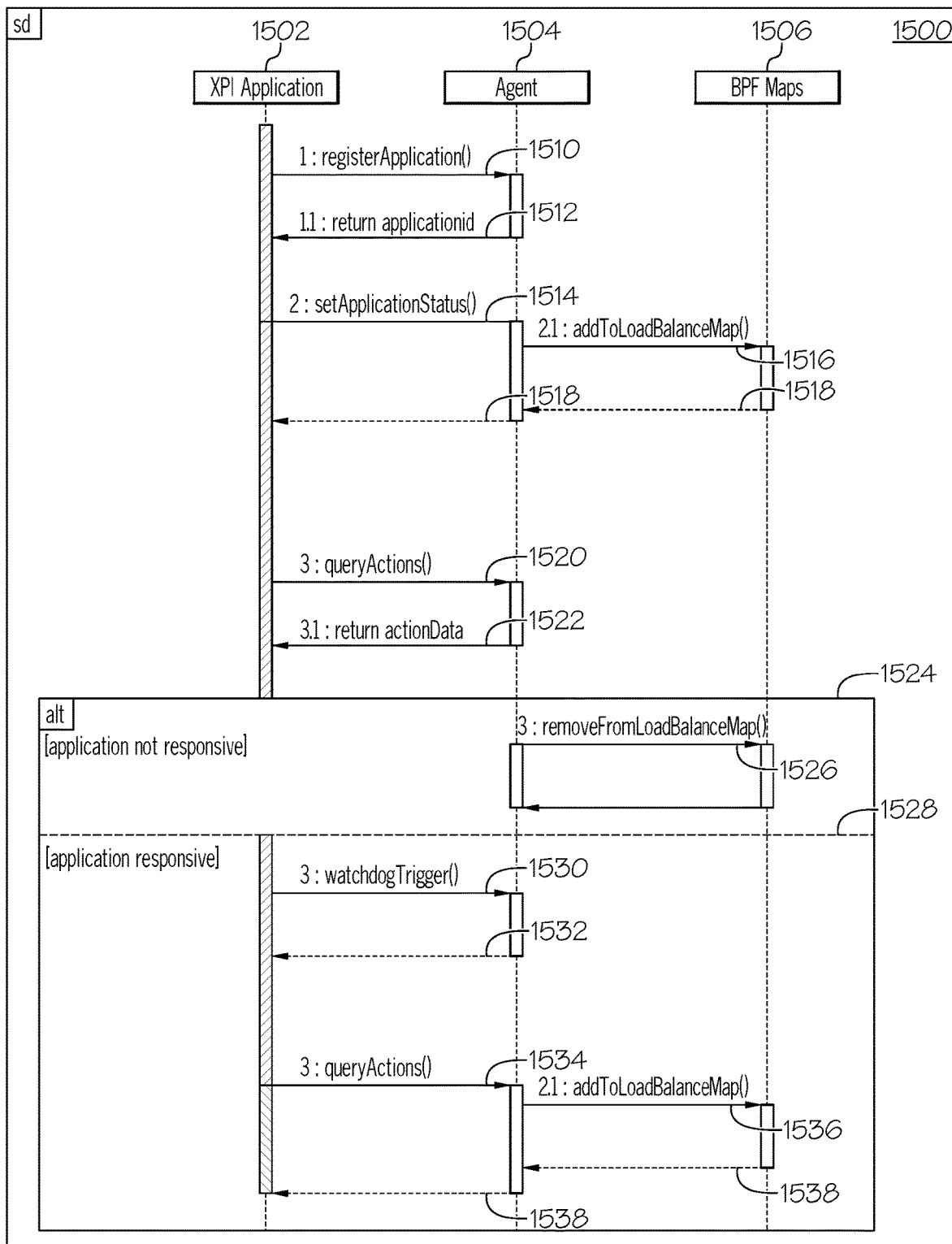
FIG. 15 depicts a sequence diagram of a basic lifecycle of an XPI application with respect to a dataplane agent, in accordance with an example embodiment.

FIG. 15 depicts a sequence diagram 1500 of a basic lifecycle of an XPI application with respect to a dataplane agent, in accordance with an example embodiment. The sequence diagram 1500 includes actions performed by each of an XPI application 1502, a dataplane agent 1504, and BPF maps 1506.

At a first step 1510, the XPI application 1502 registers with the agent 1504, whereby a return is provided by the agent 1504 to the XPI application 1502. At this point, the application state may be set to INITIALIZATION by the agent 1504. Once the XPI application 1502 is ready to process packets, it sets its status to RUNNING with the agent 1504 at the step 1514. Only when the XPI application 1502 status becomes RUNNING will XPI application 1502 be added to the load balance map of the BPF maps 1506, at a step 1516. Confirmation is provided in turn to the agent 1504 and the XPI application 1502, at step 1518.

At any time, the XPI application 1502 can then query information about all the registered applications and/or actions with the agent 1504, which is shown at a step 1520. The agent 1504 may return with results of this query at a step 1522.

Periodic watchdog messages may be sent to the agent 1504 by the XPI application 1502. If the agent 1504 does not receive one or more of these periodic watchdog messages, the agent 1504 may consider the XPI application 1502 to be STOPPED. In such a situation, when the XPI application 1502 is no longer responsive, the agent 1504 may send a message to the BPF maps 1506 to remove the XPI application 1502 from the load balance map thereof, at a step 1526.

If on the other hand, the XPI application is responsive and remains running, the watchdog messages will be triggered periodically, as shown in step 1530. Confirmation of receipt of these messages may be provided by the agent 1504 back to the XPI application 1502, via step 1532. When the XPI application shuts down gracefully, it specifically unregisters itself with the agent 1504, with a unregistration message 1534. From here, the agent 1504 provides a message to the BPF maps 1506 to remove the XPI application 1502 from the load balance map thereof, at a step 1536. This is confirmed at the agent 1504 and the XPI application 1502, via step 1538.

For each action registered with the agent, BPF actions and XPI actions, the dataplane agent may be notified about the metadata extensions and versions populated by the action, metadata extensions and versions read by the action, or the like. With this information, the dataplane agent may detect incompatibilities with the running configuration. For example, if an action needs to read a specific metadata extension version but no other action can supply that, this action will not function correctly and must be rejected.

Figure 16:
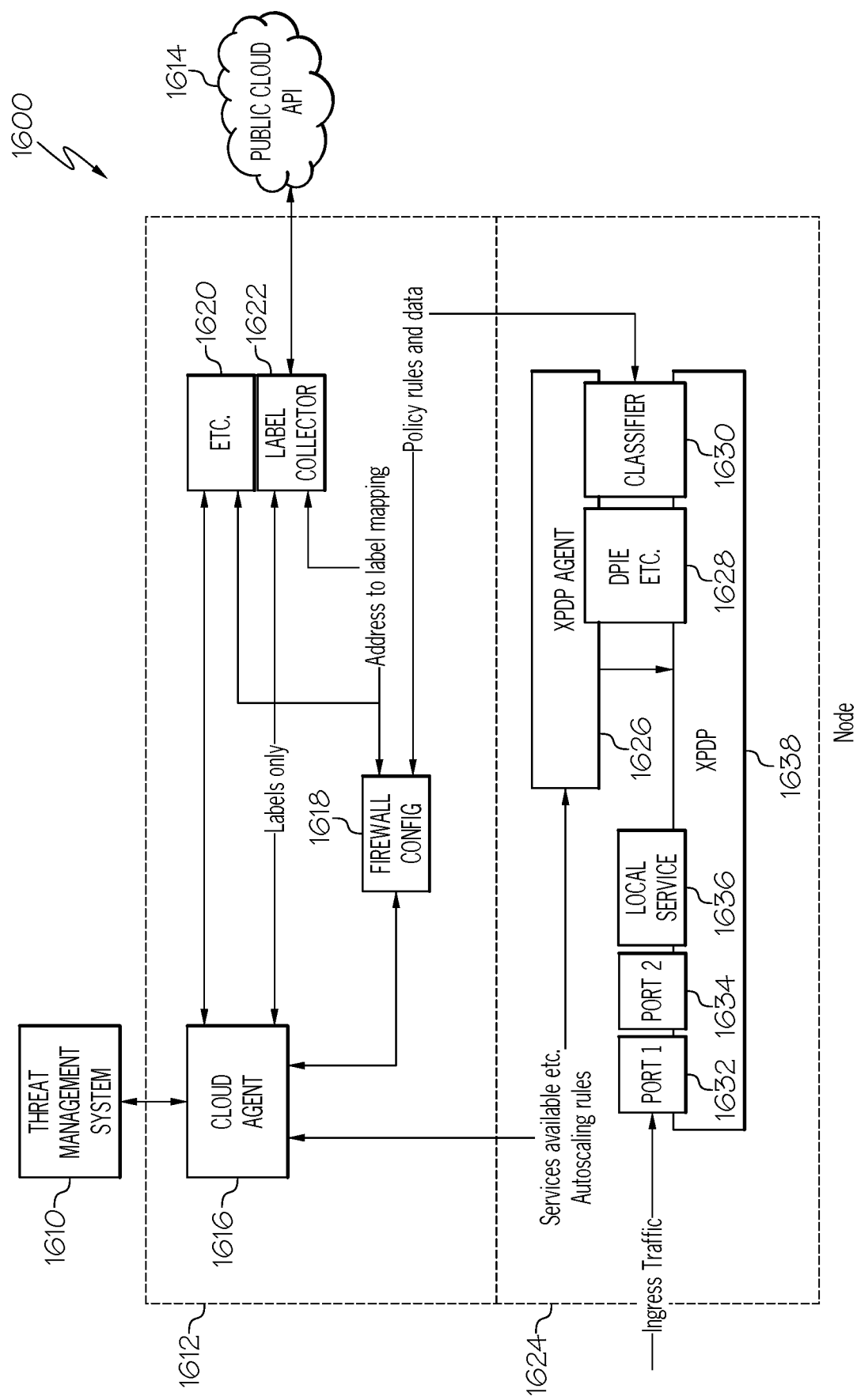
FIG. 16 depicts a computer system architecture of a threat management system, in accordance with an example embodiment.

FIG. 16 depicts a computer system architecture 1600 including a threat management system 1610, in accordance with an example embodiment. The threat management system 1610 communicates with a firewall layer 1612 which protects a node 1624 of a customer, client, or the like. The threat management system 1610 may be configured to deploy and/or control a cloud agent 1616. The cloud agent may be configured to receive or otherwise solicit changes from the threat management system 1610, and push these configuration changes to a firewall configuration 1618. Various microservices 1620, such as a label collector 1622, feeds into the cloud agent 1616 and forms part of the final policy deployed by the cloud agent 1616. The cloud agent 1616 and firewall configuration 1618 and these microservices 1620, 1622 may be connectable to a public cloud 1614, which may provide API information to the label collector 1622 and other microservices 1620. The label collector 1622 may thus push labels into the cloud agent 1616, which are then provided to the threat management system 1610. The IP address to label mapping may further be provided to the firewall configuration 1618 (as the cloud agent 1616 may not require the IP addresses). Policy rules and data may further be provided to the firewall configuration either locally or remotely (from the connected threat management system 1610).

The cloud agent 1616 may be in communication with a dataplane agent 1626 of the given node 1624. The cloud agent 1616 may provide services available, rules (such as autoscaling rules), and the like to the dataplane agent 1626. The dataplane agent 1626 may be in operable communication with a packet redirection system 1638 having a plurality of ports 1632, 1634 for receiving ingress traffic or providing egress traffic. The packet redirection system 1638 further includes associated local services 1636, classifiers 1630, and a deep packet inspection engine 1628 (or open policy agent or any other XPI service). Policy rules and data may be provided to the classifiers 1630 of the packet redirection system 1638 by the firewall configuration 1618.

The threat management system 1610 may be configured to ultimately control the various features of the dataplane agent 1626 and ultimately the various features of the node 1624, including the pods and/or containerized environments created by the dataplane agent 1626 and/or the packet redirection system 1638.

Various BPF maps may be utilized by the packet redirection systems described herein. Local maps may be defined per interface to which the program is attached, and global maps may be defined once on the particular node, shared across all XPDP programs. Example BPF maps may include a magic_value_cfg map that includes a global array with magic values to use for metadata signatures. This may be configured such that these values do not match any MAC address on the host system to avoid conflicts. A default_action map may be a global array which defines the default action set to apply to packets which do not trigger any existing flow cache entry. A reserved_vlan map may be a global array which defines the reserved 802.1Q tag to use when indicating actions have already been processed. A flow_cache map may be a global least recently used (LRU) hash that contains the flow cache lookup table. A revision map may be a global array that defines the current global flow cache revision number (unsigned integer). Any flow cache entry that doesn't contain this revision may be considered stale and will not be used. A flow_cache_timeout may be a global array which defines flow cache timeout values in seconds (unsigned intergers). A redirect_devmap map may be a global devmap hash which provides targets for XDP redirects in order to move packets from one interface to another. All interfaces that the packet redirection system programs become attached to may be added to this map. An lb_map_xpi may be a global devmap which provides targets to load balance packets toward the appropriate XPI application's control interface. If only a single instance of a particular XPI application exist, all entries may point to the same XPI control interface. If multiple instances are running, this map may provide the load balance map toward all active instances' control interfaces. An xpi_redirect_map may be a global array of maps which provides a pointer to the appropriate XPI load balance map, using the action identification as the index. An action_progs map may be a global program array which provides access to the BPF programs used for action processing. An action_cfg map may be a global array which provides per action ID configuration flags. A sys_counters map may be a global array which stores system counter values for the packet redirection system. A dbg_counters map may be a global array which stores debut counter values for the packet redirection system. A peer_index map may be a local array which defines the index of the interface needed to redirect packets back to this interface. A my_xpi_action_id may be a local array which defines the action ID associated with an XPI. The XPI socket interface may validate the next action against this value. An xpi_xsk_map may be a local XSK map which provides the XSK map to redirect packets for XSK transport. This may be indexed by queue number and may be populated by libxpi when configuring the XSK for a particular XPI application. Finally, a local_pass_action map may be a local array which defines whether an interface can pass a packet to the network stack or whether it must redirect it to the set egress_index. The above-described list of BPF maps is exemplary and more or less BPF maps may be deployed in embodiments described herein.

Figure 17:
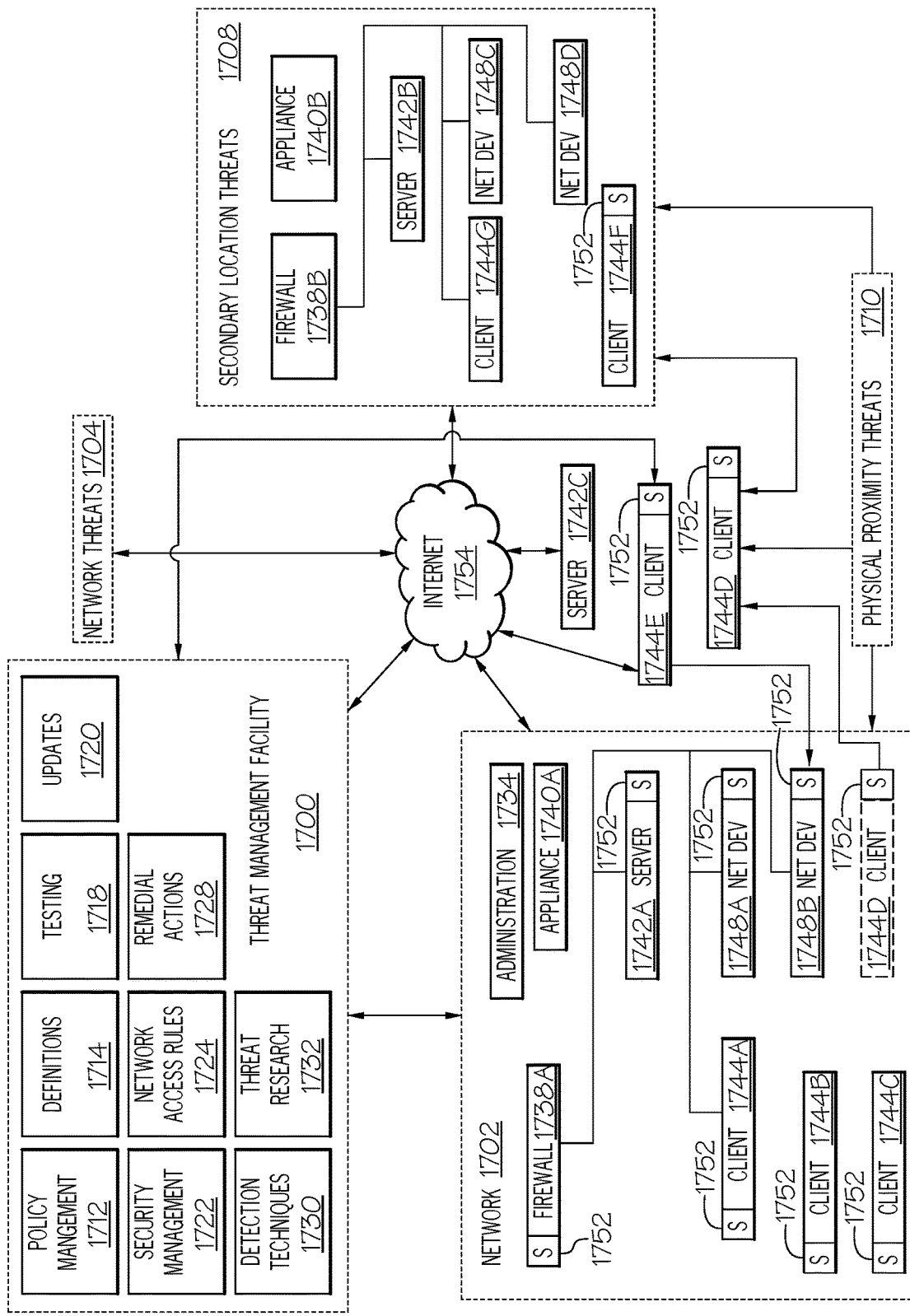
FIG. 17 depicts a diagram of an example environment for threat management according to an example embodiment.

FIG. 17 illustrates an environment for threat management, according to an example embodiment. Specifically, FIG. 17 depicts a block diagram of a threat management facility 1700 providing protection to one or more enterprises, networks, locations, users, businesses, etc. against a variety of threats-a context in which the techniques described above may usefully be deployed. The threat management facility 1700 may represent any the threat management system, such as the threat management system 1610 shown in FIG. 16.

The threat management facility 1700 may be used to protect devices and assets (e.g., IoT devices or other devices) from computer-generated and human-generated threats. For example, a corporation, school, web site, homeowner, network administrator, or other entity may institute and enforce one or more policies that control or prevents certain network users (e.g., employees, residents, users, guests, etc.) from accessing certain types of applications, devices, resources generally or in a particular manner. Policies may be created, deployed and managed, for example, through the threat management facility 1700, which may update and monitor network devices, users, and assets accordingly.

The threat of malware or other compromises may be present at various points within a network 1702 such as laptops, desktops, servers, gateways, communication ports, handheld or mobile devices, IoT devices, firewalls. In addition to controlling or stopping malicious code, a threat management facility 1700 may provide policy management to control devices, applications, or users that might otherwise undermine productivity and network performance within the network 1702.

The threat management facility 1700 may provide protection to network 1702 from computer-based malware, including viruses, spyware, adware, Trojans, intrusion, spam, policy abuse, advanced persistent threats, uncontrolled access, and the like. In general, the network 1702 may be any networked computer-based infrastructure or the like managed by a threat management facility 1702, such as an organization, association, institution, or the like, or a cloud-based facility that is available for subscription by individuals. For example, the network 1702 may be a corporate, commercial, educational, governmental, or other network 1702, and may include multiple networks, computing resources, and other facilities, may be distributed among more than one geographical locations, and may include administration 1734, a firewall 1738A, an appliance 1740A, a server 1742A, network devices 1748A-B, clients 1744A-D, such as IoT devices or other devices. It will be understood that any reference herein to a client or client facilities may include the clients 1744A-D shown in FIG. 17 and vice-versa.

The threat management facility 1700 may include computers, software, or other computing facilities supporting a plurality of functions, such as security management facility 1722, policy management facility 1712, update facility 1720, a definitions facility 1714, network access rules facility 1724, remedial action facility 1728, detection techniques facility 1730, testing facility 1718, a threat research facility 1732, and the like. In embodiments, the threat protection provided by the threat management facility 1700 may extend beyond the network boundaries of the network 1702 to include clients 1744D (or client facilities) that have moved into network connectivity not directly associated with or controlled by the network 1702. Threats to client facilities may come from a variety of sources, such as from network threats 1704, physical proximity threats 1710, secondary location threats 1708, and the like. Clients 1744A-D may be protected from threats even when the client 1744A-D is not directly connected or in association with the network 1702, such as when a client 1744E-F moves in and out of the network 1702, for example when interfacing with an unprotected server 1742C through the Internet 1754, when a client 1744F is moving into a secondary location threat 1708 network such as interfacing with components 1740B, 1742B, 1748C, 1748D that are not protected, and the like.

The threat management facility 1700 may use or may be included in an integrated system approach to provide network 1702 protection from a plurality of threats to device resources in a plurality of locations and network configurations. The threat management facility 1700 may also or instead be deployed as a stand-alone solution. For example, some or all of the threat management facility 1700 components may be integrated into a server or servers at a remote location, for example in a cloud computing facility. For example, some or all of the threat management facility 1700 components may be integrated into a firewall, gateway, or access point within or at the border of the network 1702. In some embodiments, the threat management facility 1700 may be integrated into a product, such as a third-party product, e.g., through an application programming interface, which may be deployed on endpoints, on remote servers, on internal servers or gateways for a network, or some combination of these.

The security management facility 1722 may include a plurality of elements that provide protection from malware to network 1702 device resources in a variety of ways including endpoint security and control, email security and control, web security and control, reputation-based filtering, control of unauthorized users, control of guest and non-compliant computers, and the like. The security management facility 1722 may include a local software application that provides protection to one or more network 1702 devices. The security management facility 1722 may have the ability to scan client facility files for malicious code, remove or quarantine certain applications and files, prevent certain actions, perform remedial actions and perform other security measures. This may include scanning some or all of the files stored on the client facility or accessed by the client facility on a periodic basis, scanning an application when the application is executed, scanning data (e.g., files or other communication) in transit to or from a device, etc. The scanning of applications and files may be performed to detect known or unknown malicious code or unwanted applications.

The security management facility 1722 may provide email security and control. The security management facility 1722 may also or instead provide for web security and control, such as by helping to detect or block viruses, spyware, malware, unwanted applications, and the like, or by helping to control web browsing activity originating from client devices. In an embodiment, the security management facility 1722 may provide for network access control, which may provide control over network connections. In addition, network access control may control access to virtual private networks (VPN) that provide communications networks tunneled through other networks. The security management facility 1722 may provide host intrusion prevention through behavioral based protection, which may guard against known or unknown threats by analyzing behavior before or while code executes. The security management facility 1722 may provide reputation filtering, which may target or identify sources of code.

In general, the security management facility 1722 may support overall security of the network 1702 using the various techniques described above, optionally as supplemented by updates of malicious code information and so forth for distribution across the network 1702.

The administration facility 1734 may provide control over the security management facility 1722 when updates are performed. Information from the security management facility 1722 may also be sent from the enterprise back to a third party, a vendor, or the like, which may lead to improved performance of the threat management facility 1700.

The threat management facility 1700 may include a policy management facility 1712 configured to take actions, such as to block applications, users, communications, devices, and so on based on determinations made. The policy management facility 1712 may employ a set of rules or policies that determine network 1702 access permissions for a client 1744. In an embodiment, a policy database may include a block list, a black list, an allowed list, a white list, or the like, or combinations of the foregoing, that may provide a list of resources internal or external to the network 1702 that may or may not be accessed by client devices 1744. The policy management facility 1712 may also or instead include rule-based filtering of access requests or resource requests, or other suitable techniques for controlling access to resources consistent with a corresponding policy.

The policy management facility 1712 may also provide configuration policies to be used to compare and control the configuration of applications, operating systems, hardware, devices, network associated with the network 1702. An evolving threat environment may dictate timely updates, and thus an update management facility 1720 may also be provided by the threat management facility 1700. In addition, a policy management facility 1712 may require update management (e.g., as provided by the update facility 1720 herein described). In embodiments, the update management facility 1720 may provide for patch management or other software updating, version control, and so forth.

The security facility 1722 and policy management facility 1712 may push information to the network 1702 and/or a given client 1744. The network 1702 and/or client 1744 may also or instead request information from the security facility 1722 and/or policy management facility 1712, network server facilities 1742, or there may be a combination of pushing and pulling of information. In an embodiment, the policy management facility 1712 and the security facility 1722 management update modules may work in concert to provide information to the network 1702 and/or client 1744 facility for control of applications, devices, users, and so on.

As threats are identified and characterized, the threat management facility 1700 may create updates that may be used to allow the threat management facility 1700 to detect and remediate malicious software, unwanted applications, configuration and policy changes, and the like. The threat definition facility 1714 may contain threat identification updates, also referred to as definition files. A definition file may be a virus identity file that may include definitions of known or potential malicious code. The virus identity definition files may provide information that may identify malicious code within files, applications, or the like. The definition files may be accessed by security management facility 1722 when scanning files or applications within the client facility for the determination of malicious code that may be within the file or application. A definition management facility may include a definition for a neural network or other recognition engine. A definition management facility 1714 may provide timely updates of definition files information to the network, client facilities, and the like.

The security management facility 1722 may be used to scan an outgoing file and verify that the outgoing file is permitted to be transmitted per the enterprise facility 1702 rules and policies. By checking outgoing files, the security management facility 1722 may be able to discover malicious code infected files that were not detected as incoming files.

The threat management facility 1700 may provide controlled access to the network 1702. A network access rules facility 1724 may be responsible for determining if a client facility 1744 application should be granted access to a requested network resource. In an embodiment, the network access rules facility 1724 may verify access rights for client facilities 1744 to or from the network 1702 or may verify access rights of computer facilities to or from external networks. When network access for a client facility is denied, the network access rules facility 1724 may send an information file to the client facility, e.g., a command or command file that the remedial action facility 1728 may access and take action upon. The network access rules facility 1724 may include one or more databases that may include a block list, a black list, an allowed list, a white list, a reputation list, an unacceptable network resource database, an acceptable network resource database, a network resource reputation database, or the like. The network access rules facility 1724 may incorporate rule evaluation. Rule evaluation may, for example, parse network access requests and apply the parsed information to network access rules. The network access rule facility 1724 may also or instead provide updated rules and policies to the enterprise facility 1702.

When a threat or policy violation is detected by the threat management facility 1700, the threat management facility 1700 may perform or initiate remedial action through a remedial action facility 1728. Remedial action may take a variety of forms, such as terminating or modifying an ongoing process or interaction, issuing an alert, sending a warning to a client or administration facility 1734 of an ongoing process or interaction, executing a program or application to remediate against a threat or violation, record interactions for subsequent evaluation, and so forth. The remedial action may include one or more of blocking some or all requests to a network location or resource, performing a malicious code scan on a device or application, performing a malicious code scan on the client facility 1744, quarantining a related application (or files, processes or the like), terminating the application or device, isolating the application or device, moving a process or application code to a sandbox for evaluation, isolating the client facility 1744 to a location or status within the network that restricts network access, blocking a network access port from a client facility 1744, reporting the application to an administration facility 1734, or the like, as well as any combination of the foregoing.

Remedial action may be provided as a result of a detection of a threat or violation. The detection techniques facility 1730 may include tools for monitoring the network or managed devices within the network 1702. The detection techniques facility 1730 may provide functions such as monitoring activity and stored files on computing facilities. Detection techniques, such as scanning a computer's stored files, may provide the capability of checking files for stored threats, either in the active or passive state. Detection techniques such as streaming file management may be used to check files received at the network, a gateway facility, a client facility, and the like.

Verifying that the threat management facility 1700 detects threats and violations to established policy, may require the ability to test the system, either at the system level or for a particular computing component. The testing facility 1718 may allow the administration facility 1734 to coordinate the testing of the security configurations of client facility computing facilities on a network. For example, the administration facility 1734 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 1734. The administration facility 1734 may be able to determine the level of preparedness of the client facility 1744 based on the reported information. Remedial action may be taken for any of the client facilities 1744 as determined by the administration facility 1734.

The threat management facility 1700 may provide threat protection across the network 1702 to devices such as clients 1744, a server facility 1742, an administration facility 1734, a firewall 1738, a gateway, one or more network devices (e.g., hubs and routers 1748, a threat management or other appliance 1740, any number of desktop or mobile users, and the like. As used herein the term endpoint may refer to any compute instance running on a device that can source data, receive data, evaluate data, buffer data, process data or the like (such as a user's desktop computer, laptop, IoT device, server, etc.). This may, for example, include any client devices as well as other network devices and the like within the network 1702, such as a firewall or gateway (as a data evaluation endpoint computer system), a laptop (as a mobile endpoint computer), a tablet (as a hand-held endpoint computer), a mobile phone, or the like. The term endpoint may also or instead refer to any final or intermediate source or destination for data within a network 1702. The endpoint computer security facility 1752 may be an application locally loaded onto any corresponding computer platform or computer support component, either for local security functions or for management by the threat management facility 1700 or other remote resource, or any combination of these.

The network 1702 may include a plurality of client facility computing platforms on which the endpoint computer security facility 1752 is installed. A client facility computing platform may be a computer system that is able to access a service on another computer, such as a server facility 1742, via a network. The endpoint computer security facility 1752 may, in corresponding fashion, provide security in any suitable context such as among a plurality of networked applications, for a client facility connecting to an application server facility 1742, for a web browser client facility connecting to a web server facility 1742, for an e-mail client facility retrieving e-mail from an Internet 1754 service provider's mail storage servers 1742 or web site, and the like, as well as any variations or combinations of the foregoing.

The network 1702 may include one or more of a variety of server facilities 1742, such as application servers, communications servers, file servers, database servers, proxy servers, mail servers, fax servers, game servers, web servers, and the like. A server facility 1742, which may also be referred to as a server facility 1742 application, server facility 1742 operating system, server facility 1742 computer, or the like, may be any device(s), application program(s), operating system(s), or combination of the foregoing that accepts client facility connections in order to service requests from clients 1744. In embodiments, the threat management facility 1700 may provide threat protection to server facilities 1742 within the network 1702 as load conditions and application changes are made.

A server facility 1742 may include an appliance facility 1740, where the appliance facility 1740 provides specific services to other devices on the network. Simple server facility 1742 appliances may also be utilized across the network 1702 infrastructure, such as switches, routers, hubs, gateways, print servers, modems, and the like. These appliances may provide interconnection services within the network 1702, and therefore may advance the spread of a threat if not properly protected.

A client facility 1744 may be protected from threats from within the network 1702 using a local or personal firewall, which may be a hardware firewall, software firewall, or combination, that controls network traffic to and from a client. The local firewall may permit or deny communications based on a security policy. Another component that may be protected by an endpoint computer security facility 1752 is a network firewall facility 1738, which may include hardware or software, in a standalone device or integrated with another network component, that may be configured to permit, deny, or proxy data through a network 1702.

The interface between the threat management facility 1700 and the network 1702, and through the appliance facility 1740 to embedded endpoint computer security facilities, may include a set of tools that may be the same or different for various implementations, and may allow each network administrator to implement custom controls. In embodiments, these controls may include both automatic actions and managed actions. The administration facility 1734 may configure policy rules that determine interactions. The administration facility 1734 may also establish license management, which in turn may further determine interactions associated with licensed applications. In embodiments, interactions between the threat management facility 1700 and the network 1702 may provide threat protection to the network 1702 by managing the flow of network data into and out of the network 1702 through automatic actions that may be configured by the threat management facility 1700 for example by action or configuration of the administration facility 1734.

Client facilities 1744 within the network 1702 may be connected to the network 1702 by way of wired network facilities 1748A or wireless network facilities 1748B. Mobile wireless facility clients 1744, because of their ability to connect to a wireless network access point, may connect to the Internet 1754 outside the physical boundary of the network 1702, and therefore outside the threat-protected environment of the network 1702. Such a client 1744, if not for the presence of a locally-installed endpoint computer security facility 1752, may be exposed to a malware attack or perform actions counter to network 1702 policies. Thus, the endpoint computer security facility 1752 may provide local protection against various threats and policy violations. The threat management facility 1700 may also or instead be configured to protect the out-of-enterprise facility 1702 mobile client facility (e.g., the clients 1744) through interactions over the Internet 1754 (or other network) with the locally-installed endpoint computer security facility 1752. Thus mobile client facilities that are components of the network 1702 but temporarily outside connectivity with the network 1702 may be provided with the threat protection and policy control the same as or similar to client facilities 1744 inside the network 1702. In addition, mobile client facilities 1744 may receive the same interactions to and from the threat management facility 1700 as client facilities 1744 inside the enterprise facility 1702, such as by receiving the same or equivalent services via an embedded endpoint computer security facility 1752.

Interactions between the threat management facility 1700 and the components of the network 1702, including mobile client facility extensions of the network 1702, may ultimately be connected through the Internet 1754 or any other network or combination of networks. Security-related or policy-related downloads and upgrades to the network 1702 may be passed from the threat management facility 1700 through to components of the network 1702 equipped with the endpoint computer security facility 1752. In turn, the endpoint computer security facility 1752 components of the enterprise facility or network 1702 may upload policy and access requests back across the Internet 1754 and through to the threat management facility 1700. The Internet 1754 however, is also the path through which threats may be transmitted from their source, and an endpoint computer security facility 1752 may be configured to protect a device outside the network 1702 through locally-deployed protective measures and through suitable interactions with the threat management facility 1700.

Thus, if the mobile client facility were to attempt to connect into an unprotected connection point, such as at a secondary location 1708 that is not a part of the network 1702, the mobile client facility 1744 may be required to request network interactions through the threat management facility 1700, where contacting the threat management facility 1700 may be performed prior to any other network action. In embodiments, the client facility's 1744 endpoint computer security facility 1752 may manage actions in unprotected network environments such as when the client facility (e.g., client 1744F) is in a secondary location 1708, where the endpoint computer security facility 1752 may dictate what applications, actions, resources, users, etc. are allowed, blocked, modified, or the like.

The secondary location 1708 may have no endpoint computer security facilities 1752 as a part of its components, such as its firewalls 1738B, servers 1742B, clients 1744G, hubs and routers 1748C-D, and the like. As a result, the components of the secondary location 1708 may be open to threat attacks, and become potential sources of threats, as well as any mobile enterprise facility clients 1744B-F that may be connected to the secondary location's 1708 network. In this instance, these components may now unknowingly spread a threat to other connected to the network 1702.

Some threats do not come directly from the Internet 1754. For example, a physical proximity threat 1710 may be deployed on a client device while that device is connected to an unprotected network connection outside the enterprise facility 1702, and when the device is subsequently connected to a client 1744 on the network 1702, the device can deploy the malware or otherwise pose a threat. In embodiments, the endpoint computer security facility 1752 may protect the network 1702 against these types of physical proximity threats 1710, for instance, through scanning any device prior to allowing data transfers, through security validation certificates, through establishing a safe zone within the network 1702 to receive data for evaluation, and the like.

Figure 18:
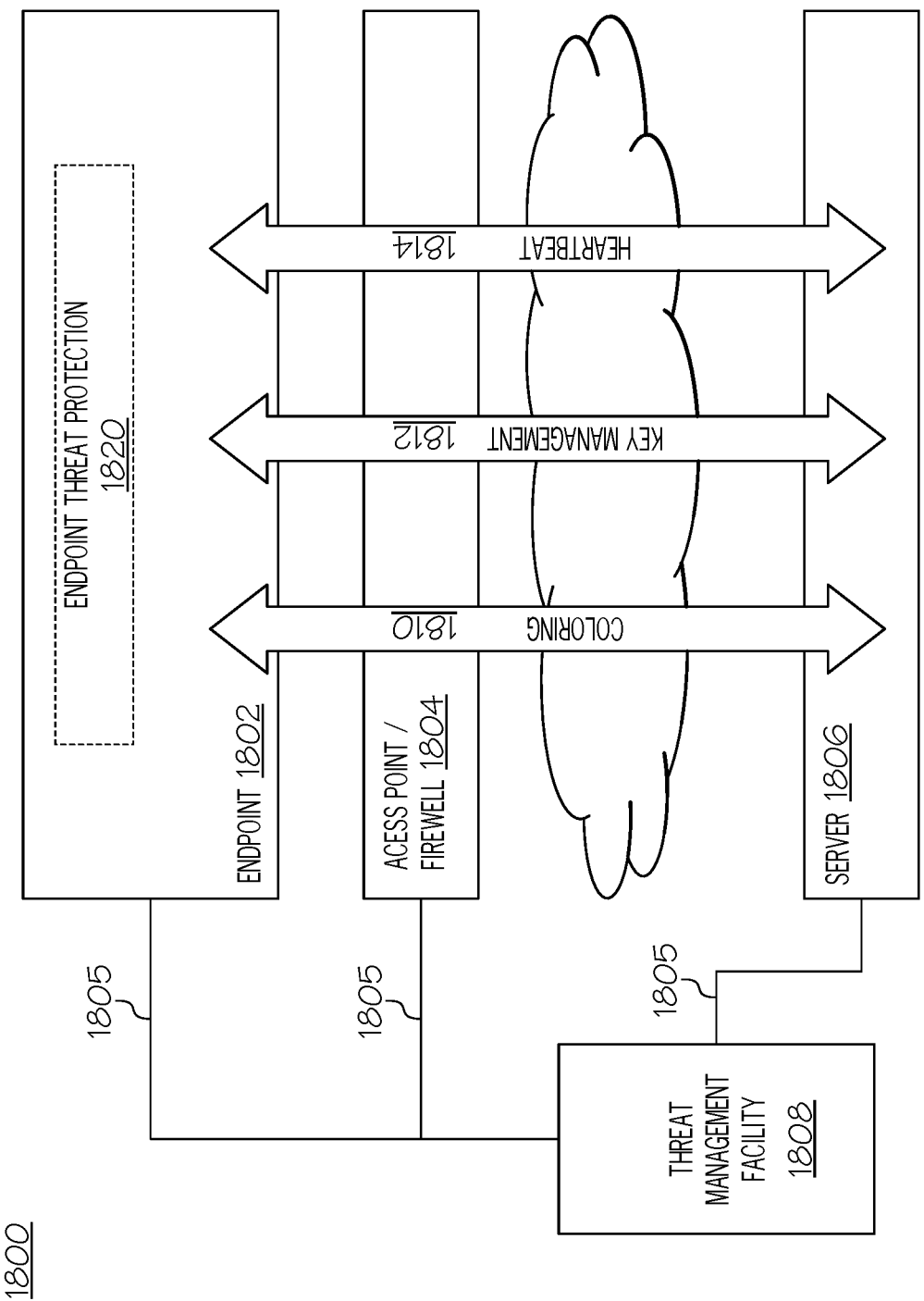
FIG. 18 depicts a diagram of an exemplary threat management system according to an example embodiment.

FIG. 18 illustrates one example of a threat management system 1800 as contemplated herein, according to an example embodiment. In general, the threat management system 1800 may include an endpoint 1802 for example, a laptop, or a device such as an IoT device, an access point 1804, a server 1806 and a threat management facility 1808 in communication with one another directly or indirectly through a data network 1805, for example, as generally described above. The threat management facility 1808 may include one or more network sensors or agents, which may be an integral component thereof for receiving information from the various endpoints 1802, servers 1806 or the like for processing and managing threats.

A number of systems may be distributed across these various components to support threat management, for example, including a coloring system 1810, a key management system 1812 and a heartbeat system 1814, each of which may include software components executing on any of the foregoing system components, and each of which may communicate with the threat management facility 1808 or an endpoint threat protection agent 1820 executing on an endpoint 1802, on an access point or firewall 1804, or on a server 1806 to support improved threat detection and remediation.

The coloring system 1810 may be used to label or 'color' software objects for improved tracking and detection of potentially harmful activity. The coloring system 1810 may, for example, label files, executables, processes, network communications, data sources and so forth with any suitable label. A variety of techniques may be used to select static and/or dynamic labels for any of these various objects, and to manage the mechanics of applying and propagating coloring information as appropriate. For example, a process may inherit a color from an application that launches the process. Similarly a file may inherit a color from a device when it is created or opened by a device, and/or a process may inherit a color from a file that the process has opened. More generally, any type of labeling, as well as rules for propagating, inheriting, changing, or otherwise manipulating such labels, may be used by the coloring system 510 as contemplated herein. A color may be or may be based on one or more reliability index values, the meeting of one or more reliability index thresholds, the rate of change of one or more reliability index values, etc. A color of a device may be used in a security policy. A color of a process, a file, a network request, and so on may be based on a color of a device, and that color may be used in a security policy.

The key management system 1812 may support management of keys for the endpoint 1002 in order to selectively permit or prevent access to content on the endpoint 1802 on a file-specific basis, a process-specific basis, an application-specific basis, a user-specific basis, or any other suitable basis in order to prevent data leakage, and in order to support more fine-grained and immediate control over access to content on the endpoint 1802 when a security compromise is detected. Thus for example, if a particular process executing on the endpoint is compromised, or potentially compromised or otherwise under suspicion, keys to that process may be revoked in order to prevent, e.g., data leakage or other malicious activity. In embodiments, keys on device may be revoked based on one or more reliability index values, the meeting of one or more reliability index thresholds, the rate of change of one or more reliability index values, etc.

The heartbeat system 1814 may be used to provide periodic or aperiodic information from an endpoint about system health, security, status, etc. A heartbeat may be encrypted or plaintext, or some combination of these, and may be communicated unidirectionally (e.g., from the endpoint 1802 to the threat management facility 1808) or bidirectionally (e.g., between the endpoint 1802 and the server 1806, or any other pair of system components) on a useful schedule.

In implementations, the access point or firewall 1804 may use the heartbeat 1814 to report a potential or actual compromise of a device based, for example, on a color of the device, or based on one or more reliability index values, the meeting of one or more reliability index thresholds, the rate of change of one or more reliability index values, etc. The heartbeat 1814 from the access point 1804 may be communicated to a server 1806, for example, and administrative server or directly or indirectly to a threat management facility 1808. If the endpoint device 1802 has an endpoint threat protection facility 1820, the facility 1820 may be used to further investigate the status, or to take remedial measures, again by communication using the secure heartbeat 1814.

In general, these various monitoring and management systems may cooperate to provide improved threat detection and response. For example, the coloring system 1810 may be used to evaluate when a particular device is potentially compromised, and a potential threat may be confirmed based on an interrupted heartbeat from the heartbeat system 1814. The key management system 1812 may then be used to revoke keys to a process so that no further files can be opened, deleted or otherwise modified. More generally, the cooperation of these systems enables a wide variety of reactive measures that can improve detection and remediation of potential threats to an endpoint.

Figure 19:
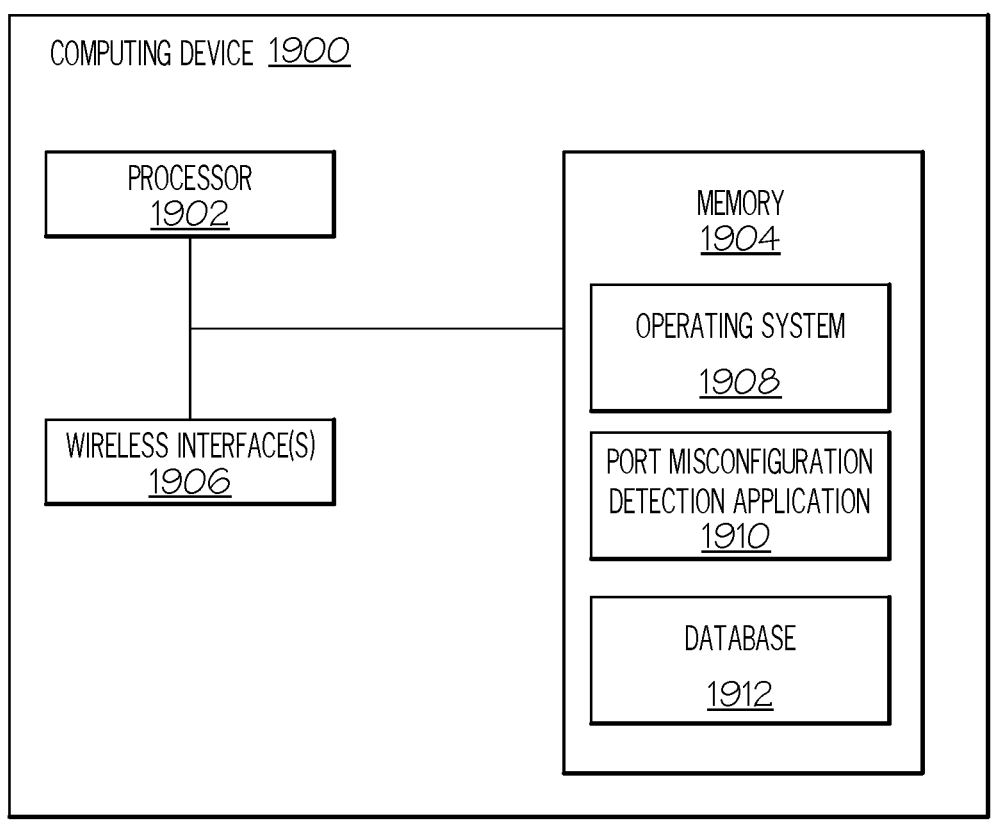
FIG. 19 depicts a diagram of an example computing device according to an example embodiment.

FIG. 19 is a diagram of an example computing device 1900, according to an example embodiment. As shown, the computing device 1900 includes one or more processors 1902, non-transitory computer readable medium or memory 1904, I/O interface devices 1906 (e.g., wireless communications, etc.) and a network interface 1908. The computer readable medium 1904 may include an operating system 1908, a data packet redirection application 1910 for redirecting data packets in accordance with the systems and methods described herein.

In operation, the processor 1902 may execute the application 1910 stored in the computer readable medium 1904. The application 1910 may include software instructions that, when executed by the processor, cause the processor to perform operations for redirecting data packets, as described and shown in FIGS. 1-16, with particular reference to the steps of the methodology shown in FIGS. 11-16.

The application program 1910 may operate in conjunction with the data section 1912 and the operating system 1908. The device 1900 may communicate with other devices (e.g., a wireless access point) via the I/O interfaces 1906.

Advantageously, the above described embodiments allow for using an unmodified operating system kernel (e.g., a Linux kernel) to redirect traffic to a variety of customized network services. These network services may be both in a userspace or in-kernel. The embodiments described herein maintain performance by chaining together services. Further, the embodiments described herein advantageously provide for chaining services dynamically and interchangeably on both a per flow and per packet level. This advantageously provides for enhanced flexibility in setting security policies by a central security management system.

Embodiments described herein advantageously allow a unique set of network services to be chained together on a per-flow or per-packet basis. Thus, a central security management system may determine when more inspection or services are necessary and apply services on a per-flow or per-packet basis as necessary. Chained services, in accordance with embodiments herein, may cooperate to work more effectively by sharing metadata with each other. As described herein, the dataplane does not dictate what information can be shared between services. Embodiments described herein may work with an unmodified version of an operating system kernel, such as a Linux kernel.

Advantageously, new network services can be introduced to an existing deployment of security services, in accordance to embodiments herein. This may be done without traffic interruption, i.e., the data plane does not require traffic to the stopped to introduce new services in accordance to the embodiments described herein. Advantageously, present embodiments may be implemented in cloud based solutions and physical devices uniformly. In either case, policies may be shared across multiple products cooperating and providing better protection across a customer, user, or monitored network system.

Although the foregoing Figures illustrate various embodiments of the disclosed systems and methods, additional and/or alternative embodiments are contemplated as falling within the scope of this disclosure. For example, in one embodiment, this disclosure provides for a method for redirecting data packets. The method includes receiving, by a first virtual ethernet device pair of a computer system having one or more computer processors, at least one data packet; intercepting, by a packet filter deployed by the first virtual ethernet device pair, the at least one data packet; redirecting, by the first virtual ethernet device pair based on the intercepting, the at least one data packet to a second virtual ethernet device pair; executing, by the second virtual ethernet device pair, an express data path data security program on the at least one data packet; and after the express data path security program has been executed on the at least one data packet, redirecting the at least one data packet back to the first virtual ethernet pair.

In another embodiment of the method, the packet filter is one or more extended Berkeley Packet Filters (eBPFs) attached to an express data path hook point.

In a further embodiment, the method further includes passing, by the first virtual ethernet device pair and the second virtual ethernet device pair, the at least one data packet through the express data path security program prior to sending the at least one data packet to a network stack.

In yet another embodiment, the method includes creating, by the computer system, a custom peer index including key and value pairs stored within packet metadata, the peer index and the packet metadata used in redirecting the at least one data packet.

In yet a further embodiment of the method, the method further includes: after the express data path security program has been executed on the at least one data packet, redirecting, by second virtual ethernet device pair, the at least one data packet to a third virtual ethernet device pair; and executing, by the third virtual ethernet pair, a second express data path data security program on the at least one data packet, wherein the at least one data packet is redirected back to the first virtual device ethernet pair after the second express data path security program has been executed.

In another embodiment, the method includes receiving, by the first virtual ethernet device pair, at least one second data packet; determining, by the first virtual ethernet device pair, that the at least one second data packet is classified as acceptable based on a user rule; and passing, by the first virtual ethernet device pair, the at least one second data packet directly to the network stack after the determining that the at least one second data packet is classified as acceptable.

In a further embodiment, the method includes associating a physical network interface controller with at least one peer of the first virtual ethernet device pair.

In yet another embodiment, the first virtual ethernet device pair is created in a container-native environment by a container network interface, and the second virtual ethernet device pair is located in a pod controlled by a threat management computer system.

In yet a further embodiment, the express path data security program is a userspace service comprising at least one of an Open Policy Agent (OPA) classifier and a Deep Packet Inspection Engine (DPIE).

In another embodiment, the disclosure provides for a computer system that includes one or more computer processors; one or more computer readable storage media; and computer readable code stored collectively in the one or more computer readable storage media, with the computer readable code including data and instructions to cause the one or more computer processors to perform a method for redirecting packets data packets, the method comprising: receiving, by a first virtual ethernet device pair of the computer system, at least one data packet; intercepting, by a packet filter deployed by the first virtual ethernet device pair, the at least one data packet; redirecting, by the first virtual ethernet device pair based on the intercepting, the at least one data packet to a second virtual ethernet device pair; executing, by the second virtual ethernet device pair, an express data path data security program on the at least one data packet; and after the express data path security program has been executed on the at least one data packet, redirecting the at least one data packet back to the first virtual ethernet pair.

In another embodiment of the computer system, the packet filter is one or more extended Berkeley Packet Filters (eBPFs) attached to an express data path hook point.

In a further embodiment of the computer system, the method further includes passing, by the first virtual ethernet device pair and the second virtual ethernet device pair, the at least one data packet through the express data path security program prior to sending the at least one data packet to a network stack.

In yet another embodiment of the computer system, the method includes creating, by the computer system, a custom peer index including key and value pairs stored within packet metadata, the peer index and the packet metadata used in redirecting the at least one data packet.

In yet a further embodiment of the computer system, the method further includes: after the express data path security program has been executed on the at least one data packet, redirecting, by second virtual ethernet device pair, the at least one data packet to a third virtual ethernet device pair; and executing, by the third virtual ethernet pair, a second express data path data security program on the at least one data packet, wherein the at least one data packet is redirected back to the first virtual device ethernet pair after the second express data path security program has been executed.

In another embodiment of the computer system, the method includes receiving, by the first virtual ethernet device pair, at least one second data packet; determining, by the first virtual ethernet device pair, that the at least one second data packet is classified as acceptable based on a user rule; and passing, by the first virtual ethernet device pair, the at least one second data packet directly to the network stack after the determining that the at least one second data packet is classified as acceptable.

In a further embodiment of the computer system, the method includes associating a physical network interface controller with at least one peer of the first virtual ethernet device pair.

In yet another embodiment of the computer system, the first virtual ethernet device pair is created in a container-native environment by a container network interface, and the second virtual ethernet device pair is located in a pod controlled by a threat management computer system.

In yet a further embodiment of the computer system, the express path data security program is a userspace service comprising at least one of an Open Policy Agent (OPA) classifier and a Deep Packet Inspection Engine (DPIE).

In another embodiment, the disclosure provides for a computer program product that includes one or more computer readable storage media having computer readable program code collectively stored on the one or more computer readable storage media, the computer readable program code being executed by one or more processors of a computer system to cause the computer system to perform a method for redirecting packets data packets. The method includes receiving, by a first virtual ethernet device pair of the computer system, at least one data packet; intercepting, by a packet filter deployed by the first virtual ethernet device pair, the at least one data packet; redirecting, by the first virtual ethernet device pair based on the intercepting, the at least one data packet to a second virtual ethernet device pair; executing, by the second virtual ethernet device pair, an express data path data security program on the at least one data packet; and after the express data path security program has been executed on the at least one data packet, redirecting the at least one data packet back to the first virtual ethernet pair.

In another embodiment of the computer program product, the express path data security program is a userspace service comprising at least one of an Open Policy Agent (OPA) classifier and a Deep Packet Inspection Engine (DPIE).

It will be appreciated that the modules, processes, systems, and sections described above may be implemented in hardware, hardware programmed by software, software instructions stored on a nontransitory computer readable medium or a combination of the above. A system as described above, for example, may include a processor configured to execute a sequence of programmed instructions stored on a nontransitory computer readable medium. For example, the processor may include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions may be compiled from source code instructions provided in accordance with a programming language such as Java, C, C++, C#.net, assembly or the like. The instructions may also comprise code and data objects provided in accordance with, for example, the Visual Basic™ language, or another structured or object-oriented programming language. The sequence of programmed instructions, or programmable logic device configuration software, and data associated therewith may be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections may be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above may be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein may be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that may be used on a variety of computer platforms. Alternatively, embodiments of the disclosed method, system, and computer program product may be implemented partially or fully in hardware using, for example, standard logic circuits or a VLSI design. Other hardware or software may be used to implement embodiments depending on the speed and/or efficiency requirements of the systems, the particular function, and/or particular software or hardware system, microprocessor, or microcomputer being utilized. Embodiments of the method, system, and computer program product may be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) may be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for secure VLAN in wireless networks.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter. It should also be understood that references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

The invention claimed is:

1. A method for redirecting data packets, comprising:
   receiving, by at least one peer of a first virtual ethernet device pair of a computer system having one or more computer processors, at least one data packet;
   intercepting, by a packet filter deployed by at least one peer of the first virtual ethernet device pair, the at least one data packet;
   redirecting, by at least one peer of the first virtual ethernet device pair based on the intercepting, the at least one data packet to at least one peer of a second virtual ethernet device pair;
   executing, by at least one peer of the second virtual ethernet device pair, an express data path data security program on the at least one data packet; and
   after the express data path security program has been executed on the at least one data packet, redirecting the at least one data packet back to at least one peer of the first virtual ethernet pair.

2. The method of claim 1, wherein the packet filter is one or more extended Berkeley Packet Filters (eBPFs) attached to an express data path hook point.

3. The method of claim 1, further comprising:
   passing the at least one data packet through the express data path security program prior to sending the at least one data packet to a network stack.

4. The method of claim 1, further comprising:
   creating, by the computer system, a custom peer index including key and value pairs stored within packet metadata, the peer index and the packet metadata used in redirecting the at least one data packet.

5. The method of claim 1, further comprising:
   after the express data path security program has been executed on the at least one data packet, redirecting, by at least one peer of the second virtual ethernet device pair, the at least one data packet to a third virtual ethernet device pair; and executing, by at least one peer of the third virtual ethernet pair, a second express data path data security program on the at least one data packet, wherein the at least one data packet is redirected back to the first virtual device ethernet pair after the second express data path security program has been executed.

6. The method of claim 1, further comprising:
receiving, by at least one peer of the first virtual ethernet device pair, at least one second data packet;
determining, by at least one peer of the first virtual ethernet device pair, that the at least one second data packet is classified as acceptable based on a user rule; and
passing, by at least one peer of the first virtual ethernet device pair, the at least one second data packet directly to the network stack after the determining that the at least one second data packet is classified as acceptable.

7. The method of claim 1, further comprising:
associating a physical network interface controller with at least one peer of the first virtual ethernet device pair.

8. The method of claim 1, wherein:
the first virtual ethernet device pair is created in a container-native environment by a container network interface, and
the second virtual ethernet device pair is located in a pod controlled by a threat management computer system.

9. The method of claim 1, wherein the express path data security program is a userspace service comprising at least one of an Open Policy Agent (OPA) classifier and a Deep Packet Inspection Engine (DPIE).

10. A computer system, comprising:
one or more computer processors;
one or more computer readable storage media; and
computer readable code stored collectively in the one or more computer readable storage media, with the computer readable code including data and instructions to cause the one or more computer processors to perform a method for redirecting data packets, the method comprising:
receiving, by at least one peer of a first virtual ethernet device pair of the computer system, at least one data packet;
intercepting, by at least one peer of a packet filter deployed by the first virtual ethernet device pair, the at least one data packet;
redirecting, by at least one peer of the first virtual ethernet device pair based on the intercepting, the at least one data packet to a second virtual ethernet device pair;
executing, by at least one peer of the second virtual ethernet device pair, an express data path data security program on the at least one data packet; and
after the express data path security program has been executed on the at least one data packet, redirecting the at least one data packet back to at least one peer of the first virtual ethernet pair.

11. The computer system of claim 10, wherein the packet filter is one or more extended Berkeley Packet Filters (eBPFs) attached to an express data path hook point.

12. The computer system of claim 10, the method further comprising:
passing the at least one data packet through the express data path security program prior to sending the at least one data packet to a network stack.

13. The computer system of claim 10, the method further comprising:
creating, by the computer system, a custom peer index including key and value pairs stored within packet metadata, the peer index and the packet metadata used in redirecting the at least one data packet.

14. The computer system of claim 10, the method further comprising:
after the express data path security program has been executed on the at least one data packet, redirecting, by at least one peer of the second virtual ethernet device pair, the at least one data packet to a third virtual ethernet device pair; and
executing, by at least one peer of the third virtual ethernet pair, a second express data path data security program on the at least one data packet, wherein the at least one data packet is redirected back to the first virtual device ethernet pair after the second express data path security program has been executed.

15. The computer system of claim 10, the method further comprising:
receiving, by at least one peer of the first virtual ethernet device pair, at least one second data packet;
determining, by at least one peer of the first virtual ethernet device pair, that the at least one second data packet is classified as acceptable based on a user rule; and
passing, by at least one peer of the first virtual ethernet device pair, the at least one second data packet directly to the network stack after the determining that the at least one second data packet is classified as acceptable.

16. The computer system of claim 10, the method further comprising:
associating a physical network interface controller with at least one peer of the first virtual ethernet device pair.

17. The computer system of claim 10, wherein:
the first virtual ethernet device pair is created in a container-native environment by a container network interface, and
the second virtual ethernet device pair is located in a pod controlled by a threat management computer system.

18. The computer system of claim 10, wherein the express path data security program is a userspace service comprising at least one of an Open Policy Agent (OPA) classifier and a Deep Packet Inspection Engine (DPIE).

19. A computer program product, comprising:
one or more non-transitory computer readable storage media having computer readable program code collectively stored on the one or more non-transitory computer readable storage media, the computer readable program code being executed by one or more processors of a computer system to cause the computer system to perform a method for redirecting data packets, the method comprising:
receiving, by at least one peer of a first virtual ethernet device pair of the computer system, at least one data packet;
intercepting, by a packet filter deployed by at least one peer of the first virtual ethernet device pair, the at least one data packet;
redirecting, by at least one peer of the first virtual ethernet device pair based on the intercepting, the at least one data packet to a second virtual ethernet device pair;
executing, by at least one peer of the second virtual ethernet device pair, an express data path data security program on the at least one data packet; and
after the express data path security program has been executed on the at least one data packet, redirecting the at least one data packet back to at least one peer of the first virtual ethernet pair.

20. The computer program product of claim 19, wherein the express path data security program is a userspace service comprising at least one of an Open Policy Agent (OPA) classifier and a Deep Packet Inspection Engine (DPIE).

\* \* \* \* \*